United States Patent
Ding et al.

(10) Patent No.: US 6,691,067 B1
(45) Date of Patent: Feb. 10, 2004

(54) ENTERPRISE MANAGEMENT SYSTEM AND METHOD WHICH INCLUDES STATISTICAL RECREATION OF SYSTEM RESOURCE USAGE FOR MORE ACCURATE MONITORING, PREDICTION, AND PERFORMANCE WORKLOAD CHARACTERIZATION

(75) Inventors: Yiping Ding, Dover, MA (US); Kenneth Newman, Cambridge, MA (US)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 09/287,601

(22) Filed: Apr. 7, 1999

(51) Int. Cl.[7] .............................................. G06F 19/00
(52) U.S. Cl. ...................... 702/186; 709/224; 709/226
(58) Field of Search ........................... 702/186; 714/1; 709/224, 226

(56) References Cited

U.S. PATENT DOCUMENTS

| | | | | |
|---|---|---|---|---|
| 5,655,081 A | * | 8/1997 | Bonnell et al. | 709/202 |
| 5,696,701 A | * | 12/1997 | Burgess et al. | 714/25 |
| 5,761,091 A | * | 6/1998 | Agrawal et al. | 702/186 |
| 5,796,633 A | * | 8/1998 | Burgess et al. | 702/187 |
| 5,920,719 A | * | 7/1999 | Sutton et al. | 717/130 |
| 6,269,401 B1 | * | 7/2001 | Fletcher et al. | 709/224 |
| 6,289,379 B1 | * | 9/2001 | Urano et al. | 709/223 |
| 6,513,065 B1 | * | 1/2003 | Hafez et al. | 709/224 |
| 6,560,647 B1 | * | 5/2003 | Hafez et al. | 709/224 |
| 6,564,174 B1 | * | 5/2003 | Ding et al. | 702/186 |

* cited by examiner

Primary Examiner—Patrick Assouad
(74) Attorney, Agent, or Firm—Wong, Cabello, Lutsch, Rutherford & Brucculeri, LLP

(57) ABSTRACT

A system and method for estimating statistics concerning system metrics to provide for the accurate and efficient monitoring of one or more computer systems. The system preferably comprises a distributed computing environment, i.e., an enterprise, which comprises a plurality of interconnected computer systems. At least one of the computer systems is an agent computer system which includes agent software and/or system software for the collection of data relating to one or more metrics, i.e., measurements of system resources. Metric data is continually collected over the course of a measurement interval, regularly placed into a registry of metrics, and then periodically sampled from the registry indirectly. Sampling-related uncertainty and inaccuracy arise from two primary sources: the unsampled residual segments of seen (i.e., sampled and therefore known) events, and unseen (i.e., unsampled and therefore unknown) events. The total unsampled utilization and the total unseen utilization are accurately estimated according to the properties of one or more process service time distributions. The total unseen utilization is also estimated with an iterative method using gradations of the sample interval. The length distribution of the unseen processes is determined with the same iterative method.

75 Claims, 18 Drawing Sheets

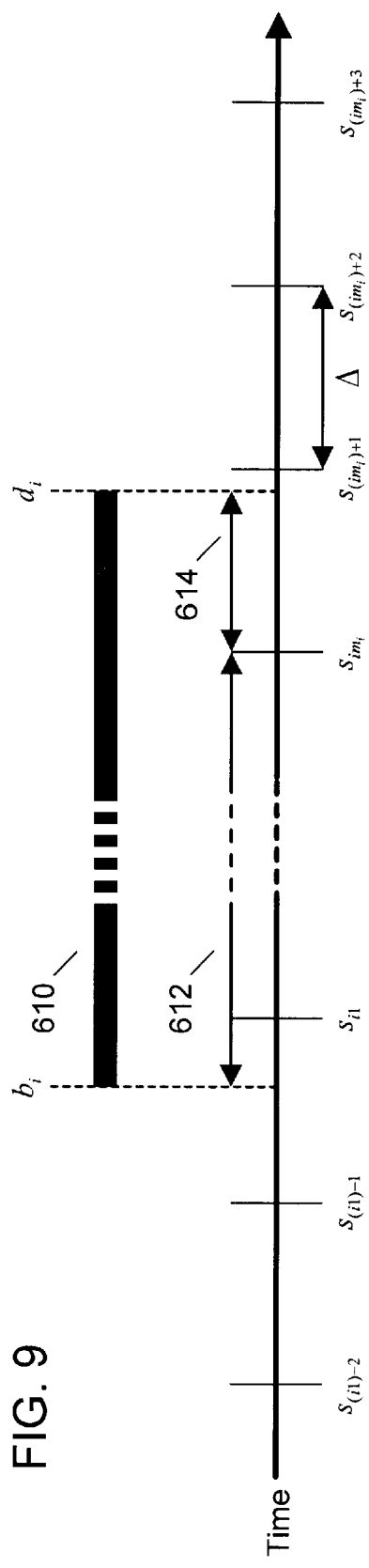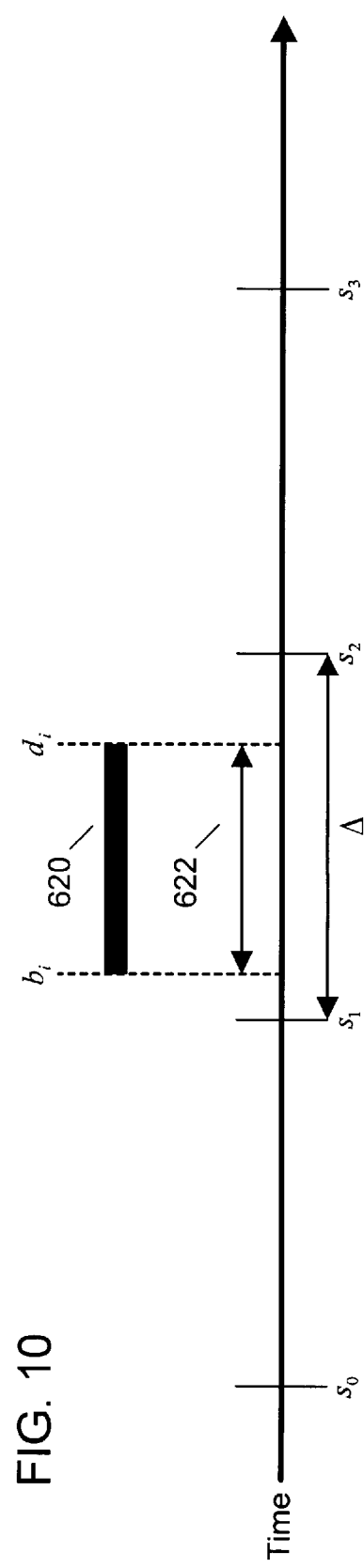
FIG. 9
FIG. 10

$$U_{us(i)} = \frac{t_i(1-e_{\max})}{t_i(1-e_{\max}) + \sum_{k=0}^{i-1}(m-(k+1))f_k} U_{us}$$

FIG. 22

$$U_{us(j)} = \frac{(m-(j+1))f_j}{t_i(1-e_{\max}) + \sum_{k=0}^{i-1}(m-(k+1))f_k} U_{us}$$

FIG. 23

ENTERPRISE MANAGEMENT SYSTEM AND METHOD WHICH INCLUDES STATISTICAL RECREATION OF SYSTEM RESOURCE USAGE FOR MORE ACCURATE MONITORING, PREDICTION, AND PERFORMANCE WORKLOAD CHARACTERIZATION

BACKGROUND OF THE INVENTION

1. Field of the Invention

The present invention relates to the collection, analysis, and management of system resource data in distributed or enterprise computer systems, and particularly to the more accurate monitoring of the state of a computer system and more accurate prediction of system performance.

2. Description of the Related Art

The data processing resources of business organizations are increasingly taking the form of a distributed computing environment in which data and processing are dispersed over a network comprising many interconnected, heterogeneous, geographically remote computers. Such a computing environment is commonly referred to as an enterprise computing environment, or simply an enterprise. Managers of the enterprise often employ software packages known as enterprise management systems to monitor, analyze, and manage the resources of the enterprise. Enterprise management systems may provide for the collection of measurements, or metrics, concerning the resources of individual systems. For example, an enterprise management system might include a software agent on an individual computer system for the monitoring of particular resources such as CPU usage or disk access. U.S. Pat. No. 5,655,081 discloses one example of an enterprise management system.

In a sophisticated enterprise management system, tools for the analysis, modeling, planning, and prediction of system resource utilization are useful for assuring the satisfactory performance of one or more computer systems in the enterprise. Examples of such analysis and modeling tools are the "ANALYZE" and "PREDICT" components of "BEST/1 FOR DISTRIBUTED SYSTEMS" available from BMC Software, Inc. Such tools usually require the input of periodic measurements of the usage of resources such as central processing units (CPUs), memory, hard disks, network bandwidth, and the like. To ensure accurate analysis and modeling, therefore, the collection of accurate performance data is critical.

Many modern operating systems, including "WINDOWS NT" and UNIX, are capable of recording and maintaining an enormous amount of performance data and other data concerning the state of the hardware and software of a computer system. Such data collection is a key step for any system performance analysis and prediction. The operating system or system software collects raw performance data, usually at a high frequency, stores the data in a registry of metrics, and then periodically updates the data. In most cases, metric data is not used directly, but is instead sampled from the registry. Sampling at a high frequency, however, can consume substantial system resources such as CPU cycles, storage space, and I/O bandwidth. Therefore, it is impractical to sample the data at a high frequency. On the other hand, infrequent sampling cannot capture the complete system state: for example, significant short-lived events and/or processes can be missed altogether. Infrequent sampling may therefore distort a model of a system's performance. The degree to which the sampled data reliably reflects the raw data determines the usefulness of the performance model for system capacity planning. The degree of reliability also determines the usefulness of the performance statistics presented to end-users by performance tools.

Sensitivity to sampling frequency varies among data types. Performance data can be classified into three categories: cumulative, transient, and constant. Cumulative data is data that accumulates over time. For example, a system CPU time counter may collect the total number of seconds that a processor has spent in system state since system boot. With transient data, old data is replaced by new data. For example, the amount of free memory is a transient metric which is updated periodically to reflect the amount of memory not in use. However, values such as the mean, variance, and standard deviation can be computed based on a sampling history of the transient metric. The third type of performance data, constant data, does not change over the measurement interval or lifetime of the event. For example, system configuration information, process ID, and process start time are generally constant values.

Of the three data types, transient performance metrics are the most sensitive to variations in the sample interval and are therefore the most likely to be characterized by uncertainty. For example, with infrequent sampling, some state changes may be missed completely. However, cumulative data may also be rendered uncertain by infrequent sampling, especially with regard to the variance of such a metric. Clearly, then, uncertainty of data caused by infrequent sampling can cause serious problems in performance modeling. Therefore, the goal is to use sampling to capture the essence of the system state with a sufficient degree of certainty. Nevertheless, frequent sampling is usually not a viable option because of the heavy resource usage involved.

For the foregoing reasons, there is a need for data collection and analysis tools and methods that accurately and efficiently reflect system resource usage at a lower sampling frequency.

SUMMARY OF THE INVENTION

The present invention is directed to a system and method that meet the needs for more accurate and efficient monitoring and prediction of computer system performance. In the preferred embodiment, the system and method are used in a distributed computing environment, i.e., an enterprise. The enterprise comprises a plurality of computer systems, or nodes, which are interconnected through a network. At least one of the computer systems is a monitor computer system from which a user may monitor the nodes of the enterprise. At least one of the computer systems is an agent computer system. An agent computer system includes agent software and/or system software that permits the collection of data relating to one or more metrics, i.e., measurements of system resources on the agent computer system. In the preferred embodiment, metric data is continually collected at a high frequency over the course of a measurement interval and placed into a registry of metrics. The metric data is not used directly but rather is routinely sampled at a constant sample interval from the registry of metrics. Because sampling uses substantial system resources, sampling is preferably performed at a lesser frequency than the frequency of collection.

Sampled metric data can be used to build performance models for analysis and capacity planning. However, less frequent sampling can result in inaccurate models and data uncertainty, especially regarding the duration of events or processes and the number of events or processes. The present invention is directed to reducing said uncertainty. Uncertainty arises from two primary sources: the unsampled segment of a seen process or event, and the unseen process or event. A seen process is a process that is sampled at least once; therefore, its existence and starting time are known. However, the residual time or utilization between the last sampling of the process or event and the death of the process or the termination of the event is unsampled and unknown. An unseen process is shorter than the sample interval and is not sampled at all, and therefore its entire utilization is unknown. Nevertheless, the total unsampled (i.e., residual) utilization and the total unseen utilization can be estimated with the system and method of the present invention.

In determining the total unsampled utilization, a quantity of process service time distributions are determined, and each of the seen processes are assigned respective process service time distributions. For each distribution, a mean residual time is calculated using equations provided by the system and method. The total unsampled utilization is the sum of the mean residual time multiplied by the number of seen processes for each distribution, all divided by the measurement interval.

In determining the total unseen utilization, first the total captured utilization is determined to be the sum of the sampled utilizations of all seen processes over the measurement interval. Next the total measured utilization, or the "actual" utilization over the measurement interval, is obtained from the system software or monitoring software. The difference between the total measured utilization and the total captured utilization is the uncertainty. Because the uncertainty is due to either unsampled segments or unseen events, the total unseen utilization is calculated to be the uncertainty (the total measured utilization minus the total captured utilization) minus the total unsampled utilization.

When the total measured utilization is not available, the total unseen utilization is estimated with an iterative bucket method. A matrix of buckets are created, wherein each row corresponds to the sample interval and each bucket to a gradation of the sample interval. Each process is placed into the appropriate bucket according to how many times it was sampled and when in the sample interval it began. Starting with the bucket with the longest process(es) and working iteratively back through the other buckets, the number of unseen processes are estimated for each length gradation of the sample interval. The iterative bucket method is also used to determine a length distribution of unseen processes.

In response to the determination of utilizations described above, the system and method are able to use this information in modeling and/or analyzing the enterprise. In various embodiments, the modeling and/or analyzing may further comprise one of more of the following: displaying the determinations to a user, predicting future performance, graphing a performance prediction, generating reports, asking a user for further data, permitting a user to modify a model of the enterprise, and altering a configuration of the enterprise in response to the determinations.

BRIEF DESCRIPTION OF THE DRAWINGS

A better understanding of the present invention can be obtained when the following detailed description of the preferred embodiment is considered in conjunction with the following drawings, in which:

FIG. 9 is a diagram illustrating an unsampled segment of a seen event;

FIG. 10 is a diagram illustrating an unseen event;

FIGS. 22 and 23 are equations which are used to generate a length distribution of the unseen processes.

DETAILED DESCRIPTION OF THE PREFERRED EMBODIMENT

U.S. Pat. No. 5,655,081 titled "System for Monitoring and Managing Computer Resources and Applications Across a Distributed Environment Using an Intelligent. Autonomous Agent Architecture" is hereby incorporated by reference as though fully and completely set forth herein.

U.S. Pat. No. 5,761,091 titled "Method and System for Reducing the Errors in the Measurements of Resource Usage in Computer System Processes and Analyzing Process Data with Subsystem Data" is hereby incorporated by reference as though fully and completely set forth herein.

Figure 1:
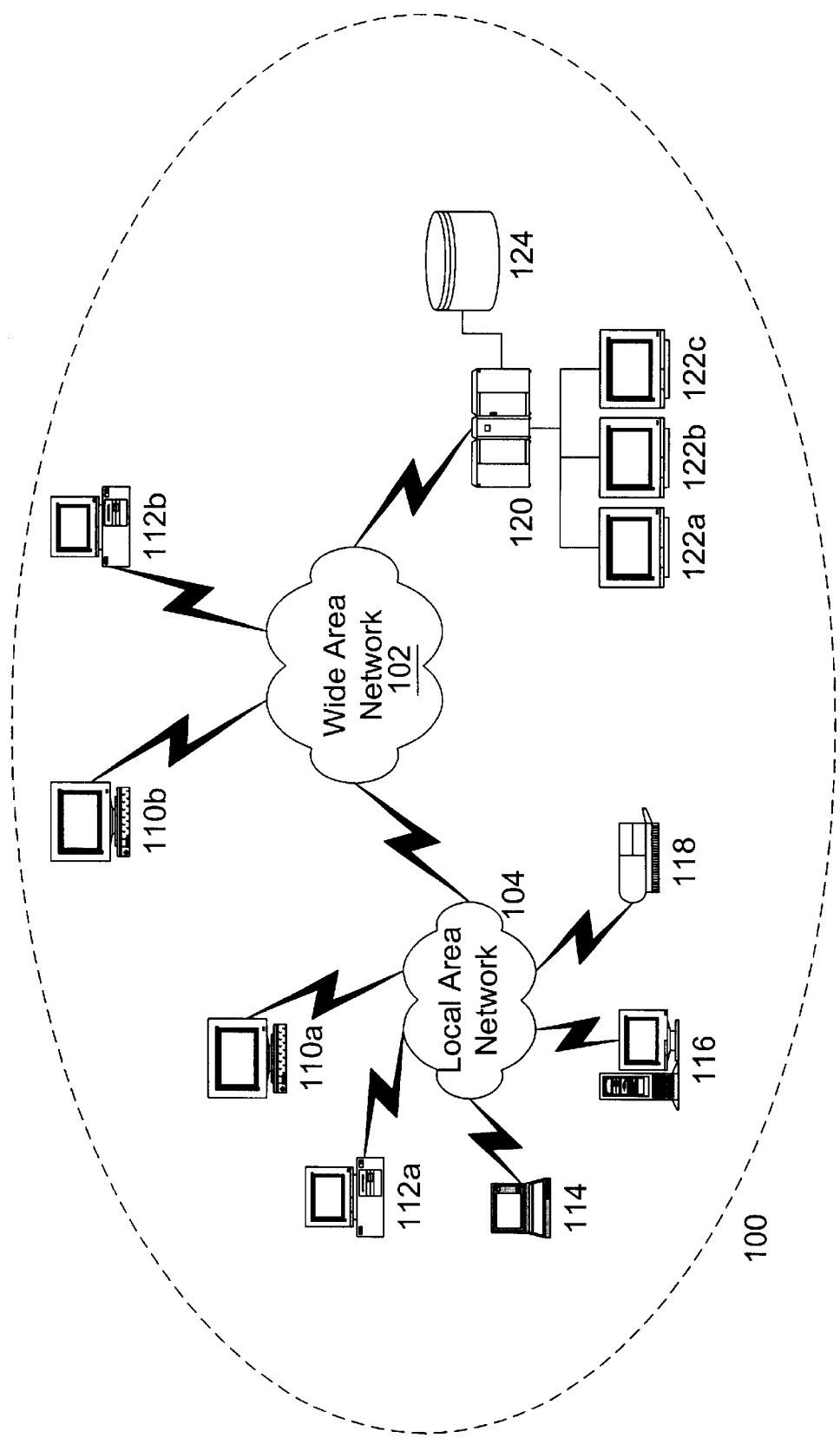
FIG. 1 is a network diagram of an illustrative enterprise computing environment.

FIG. 1 illustrates an enterprise computing environment according to one embodiment of the present invention. An enterprise 100 comprises a plurality of computer systems which are interconnected through one or more networks. Although one particular embodiment is shown in FIG. 1, the enterprise 100 may comprise a variety of heterogeneous computer systems and networks which are interconnected in a variety of ways and which run a variety of software applications.

One or more local area networks (LANs) 104 may be included in the enterprise 100. A LAN 104 is a network that spans a relatively small area. Typically, a LAN 104 is confined to a single building or group of buildings. Each node (i.e., individual computer system or device) on a LAN 104 preferably has its own CPU with which it executes programs, and each node is also able to access data and devices anywhere on the LAN 104. The LAN 104 thus allows many users to share devices (e.g., printers) as well as data stored on file servers. The LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves). As illustrated in FIG. 1, the enterprise 100 includes one LAN 104. However, in alternate embodiments the enterprise 100 may include a plurality of LANs 104 which are coupled to one another through a wide area network (WAN) 102. A WAN 102 is a network that spans a relatively large geographical area.

Each LAN 104 comprises a plurality of interconnected computer systems and optionally one or more other devices: for example, one or more workstations 110a, one or more personal computers 112a, one or more laptop or notebook computer systems 114, one or more server computer systems 116, and one or more network printers 118. As illustrated in FIG. 1, the LAN 104 comprises one of each of computer systems 110a, 112a, 114, and 116, and one printer 118. The LAN 104 may be coupled to other computer systems and/or other devices and/or other LANs 104 through a WAN 102.

One or more mainframe computer systems 120 may optionally be coupled to the enterprise 100. As shown in FIG. 1, the mainframe 120 is coupled to the enterprise 100 through the WAN 102, but alternatively one or more mainframes 120 may be coupled to the enterprise 100 through one or more LANs 104. As shown, the mainframe 120 is coupled to a storage device or file server 124 and mainframe terminals 122a, 122b, and 122c. The mainframe terminals 122a, 122b, and 122c access data stored in the storage device or file server 124 coupled to or comprised in the mainframe computer system 120.

The enterprise 100 may also comprise one or more computer systems which are connected to the enterprise 100 through the WAN 102: as illustrated, a workstation 110b and a personal computer 112b. In other words, the enterprise 100 may optionally include one or more computer systems which are not coupled to the enterprise 100 through a LAN 104. For example, the enterprise 100 may include computer systems which are geographically remote and connected to the enterprise 100 through the Internet.

Figure 2:
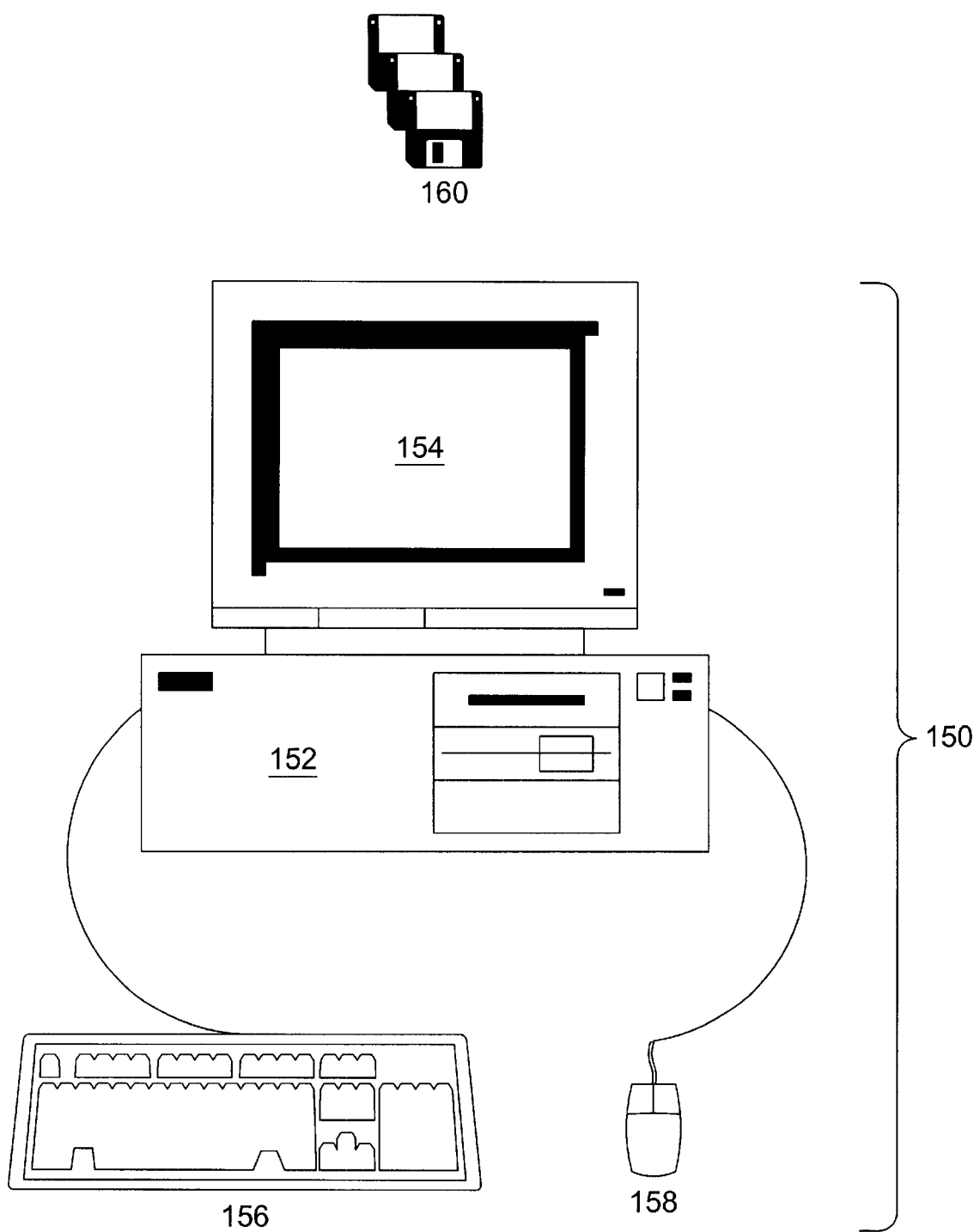
FIG. 2 is an illustration of a typical computer system with computer software programs.

The present invention preferably comprises computer programs 160 stored on or accessible to each computer system in the enterprise 100. FIG. 2 illustrates computer programs 160 and a typical computer system 150. Each computer system 150 typically comprises components such as a CPU 152, with an associated memory media. The memory media stores program instructions of the computer programs 160, wherein the program instructions are executable by the CPU 152. The memory media preferably comprises a system memory such as RAM and/or a nonvolatile memory such as a hard disk. The computer system 150 further comprises a display device such as a monitor 154, an alphanumeric input device such as a keyboard 156, and optionally a directional input device such as a mouse 158. The computer system 150 is operable to execute computer programs 160.

When the computer programs are executed on one or more computer systems 150, an enterprise management system 180 is operable to monitor, analyze, and manage the computer programs, processes, and resources of the enterprise 100. Each computer system 150 in the enterprise 100 executes or runs a plurality of software applications or processes. Each software application or process consumes a portion of the resources of a computer system and/or network: for example, CPU time, system memory such as RAM, nonvolatile memory such as a hard disk, network bandwidth, and input/output (I/O). The enterprise management system 180 permits users to monitor, analyze, and manage resource usage on heterogeneous computer systems 150 across the enterprise 100.

Figure 3:
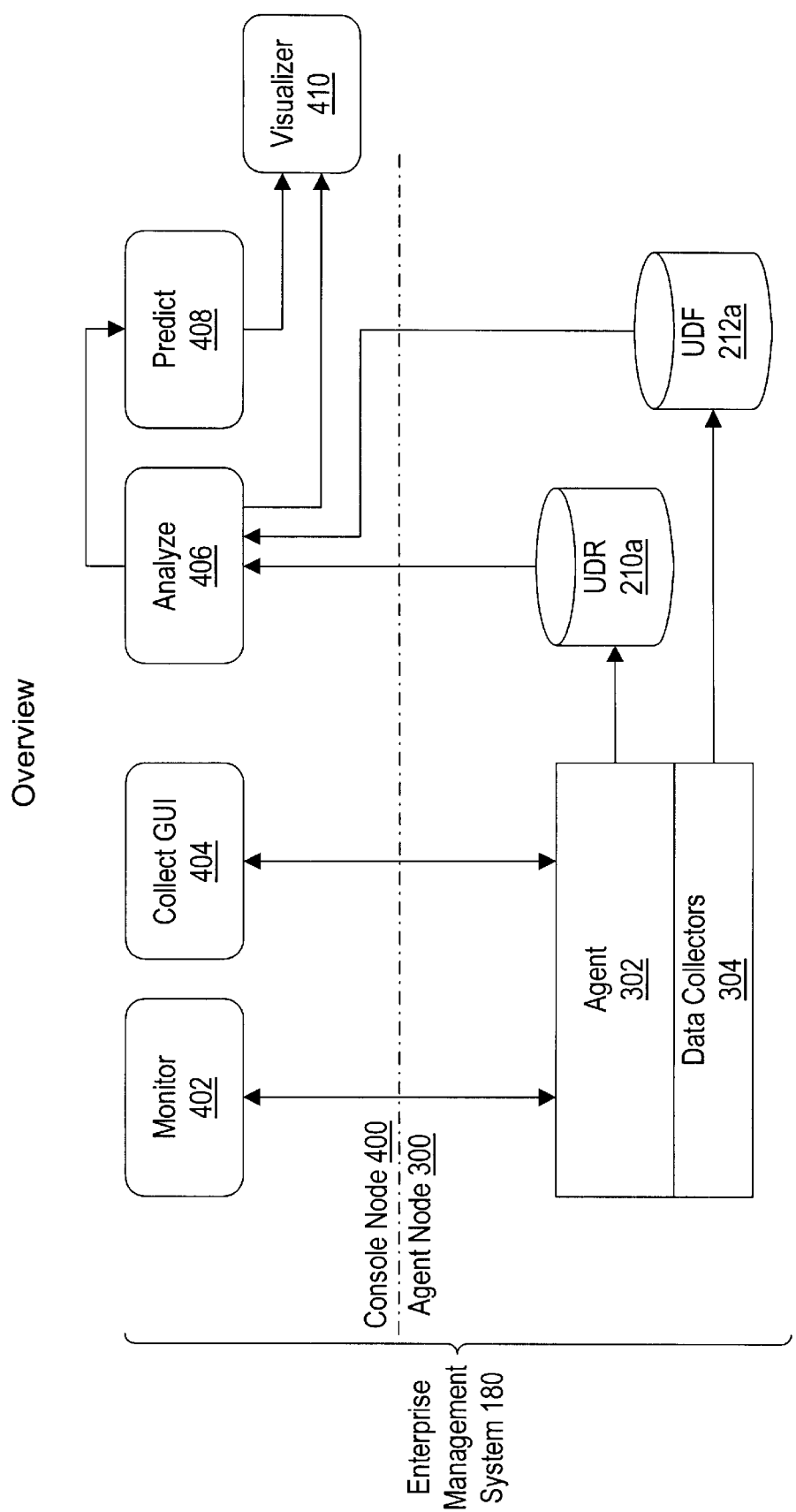
FIG. 3 is a block diagram illustrating an overview of the enterprise management system according to the preferred embodiment of the present invention.

FIG. 3 shows an overview of the enterprise management system 180. The enterprise management system 180 includes at least one console node 400 and at least one agent node 300, but it may include a plurality of console nodes 400 and/or a plurality of agent nodes 300. In general, an agent node 300 executes software to collect metric data on its computer system 150, and a console node 400 executes software to monitor, analyze, and manage the collected metrics from one or more agent nodes 300. A metric is a measurement of a particular system resource. For example, in the preferred embodiment, the enterprise management system 180 collects metrics such as CPU, disk I/O, file system usage, database usage, threads, processes, kernel, registry, logical volumes, and paging. Each computer system 150 in the enterprise 100 may comprise a console node 400, an agent node 300, or both a console node 400 and an agent node 300 in the preferred embodiment, server computer systems include agent nodes 300, and other computer systems may also comprise agent nodes 300 as desired, e.g., file servers, print servers, e-mail servers, and internet servers. The console node 400 and agent node 300 are characterized by an end-by-end relationship: a single console node 400 may be linked to a single agent node 300, or a single console node 400 may be linked to a plurality of agent nodes 300, or a plurality of console nodes 400 may be linked to a single agent node 300, or a plurality of console nodes 400 may be linked to a plurality of agent nodes 300.

In the preferred embodiment, the console node 400 comprises four user-visible components: a Monitor component 402, a Collect graphical user interface (GUI) 404, an Analyze component 406, and a Predict component 408. In one embodiment, all four components 402, 404, 406, and 408 of the console node 400 are part of the "BEST/1 FOR DISTRIBUTED SYSTEMS" software package or the "PATROL" software package, all available from BMC Software, Inc. The agent node 300 comprises an Agent 302, one or more data collectors 304, Universal Data Repository (UDR) history files 210a, and Universal Data Format (UDF) history files 212a. In alternate embodiments, the agent node 300 includes either of UDR 210a or UDF 212a, but not both.

The Monitor component 402 allows a user to monitor, in real-time, data that is being collected by an Agent 302 and being sent to the Monitor 402. The Collect GUI 404 is employed to schedule data collection on an agent node 302. The Analyze component 406 takes historical data from a UDR 210a and/or UDF 212a to create a model of the enterprise 100. The Predict component 408 takes the model from the Analyze component 406 and allows a user to alter the model by specifying hypothetical changes to the enterprise 100. Analyze 406 and Predict 408 can create output in a format which can be understood and displayed by a Visualizer tool 410. In the preferred embodiment, Visualizer 410 is the "BEST/1-VISUALIZER" available from BMC Software, Inc. In one embodiment, Visualizer 410 is also part of the console node 400.

The Agent 302 controls data collection on a particular computer system and reports the data in real time to one or more Monitors 402. In the preferred embodiment, the Agent 302 is the part of the "BEST/1 FOR DISTRIBUTED SYSTEMS" software package available from BMC Software, Inc. The data collectors 304 collect data from various processes and subsystems of the agent node 300. The Agent 302 sends real-time data to the UDR 210a, which is a database of historical data in a particular data format. The UDF 212a is similar to the UDR 210a, but the UDF 212a uses an alternative data format and is written directly by the data collectors 304.

Figure 4:
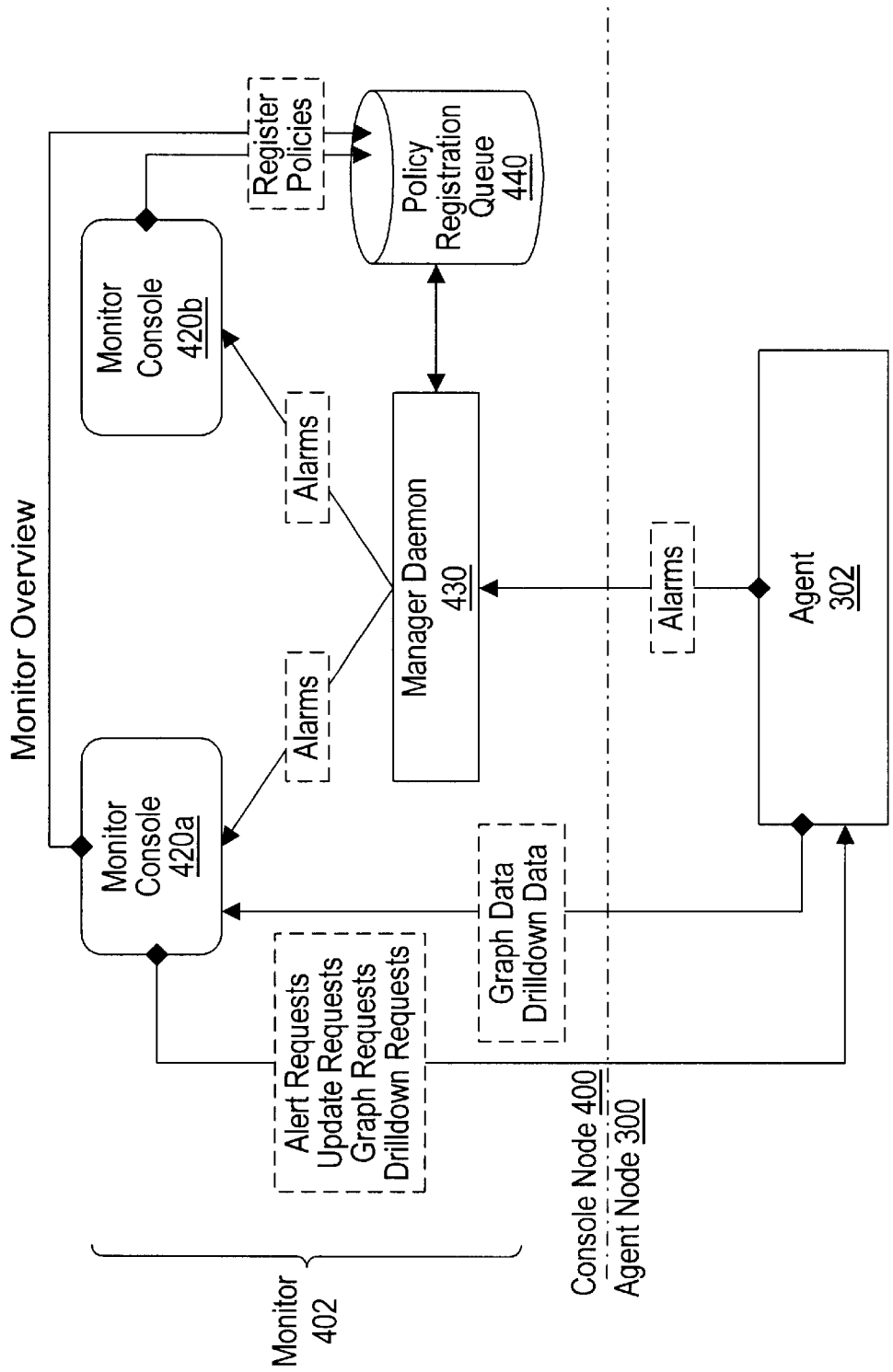
FIG. 4 is a block diagram illustrating an overview of the Monitor component of the enterprise management system according to the preferred embodiment of the present invention.

FIG. 4 shows an overview of the Monitor component 402 of the console node 400 of the enterprise management system 180. The Monitor 402 comprises a Manager Daemon 430, one or more Monitor Consoles (as illustrated, 420a and 420b), and a Policy Registration Queue 440. Although two Monitor Consoles 420a and 420b are shown in FIG. 4, the present invention contemplates that one or more Monitor Consoles may be executing on any of one or more console nodes 400.

In the preferred embodiment, the Monitor Consoles 420a and 420b use a graphical user interface (GUI) for user input and information display. Preferably, the Monitor Consoles 420a and 420b are capable of sending several different types of requests to an Agent 302, including: alert requests, update requests, graph requests, and drilldown requests. An alert request specifies one or more thresholds to be checked on a routine basis by the Agent 302 to detect a problem on the agent node 300. For example, an alert request might ask the Agent 302 to report to the Monitor Console 420a whenever usage of a particular software process exceeds a particular threshold relative to overall CPU usage on the agent node 300. An update request is a request for the status of the Agent 302. For example, the requested status information might include the version number of the Agent 302 or the presence of any alarms in the Agent 302. A graph request is a request to receive graph data, i.e., data on a metric as routinely collected by the Agent 302, and to receive the data in real time, i.e., whenever it becomes available from the present time onward. By obtaining and displaying graph data, the Monitor Console 420a enables the rapid identification and communication of potential application and system performance problems. Preferably, the Monitor Console 420a displays graph data in a graphical format. A drilldown request is a request to receive drilldown data, i.e., data on an entire metric group (a set of metrics) as collected by the Agent 302. By obtaining and displaying drilldown data, the Monitor Console 420a provides the ability to focus, in real-time, on a specific set of processes, sessions, or users. Preferably, the Monitor Console 420a displays drilldown data in a tabular format.

Whenever the Agent 302 generates an alarm to indicate a troublesome status on the agent node 300, the Manager Daemon 430 intercepts the alarm and feeds the alarm to one or more Monitor Consoles, such as 420a and 420b. Typically, an alarm is a notification that a particular threshold has been exceeded on a monitored process or subsystem on an agent node 300. The Manager Daemon 430 is capable of receiving alarms from a plurality of Agents 302. A Manager Daemon 430 is preferably always running on each console node 400 so that alarms can be captured even when the Monitor Consoles 420a and 420b are offline.

Each of the Monitor Consoles 420a and 420b is able to issue one or more policies. A policy defines a disparate set of metrics to be collected on one or more agent nodes 300. In other words, a policy allows a Monitor Console 420a or 420b to monitor one or more metrics on one or more agent nodes 300 simultaneously. For example, a user could build and deploy a policy that restricts web browser access on a plurality of agent nodes 300 with the following set of interrelated conditions: "IF more than 80% of server CPU is required by critical production applications, AND the run queue length is greater than six, AND active time on production disks exceeds 40%." Policies are registered with the Policy Registration Queue 440, from which they are disseminated to the appropriate Agents 302. An Agent 302 can execute a plurality of policies simultaneously.

Figure 5:
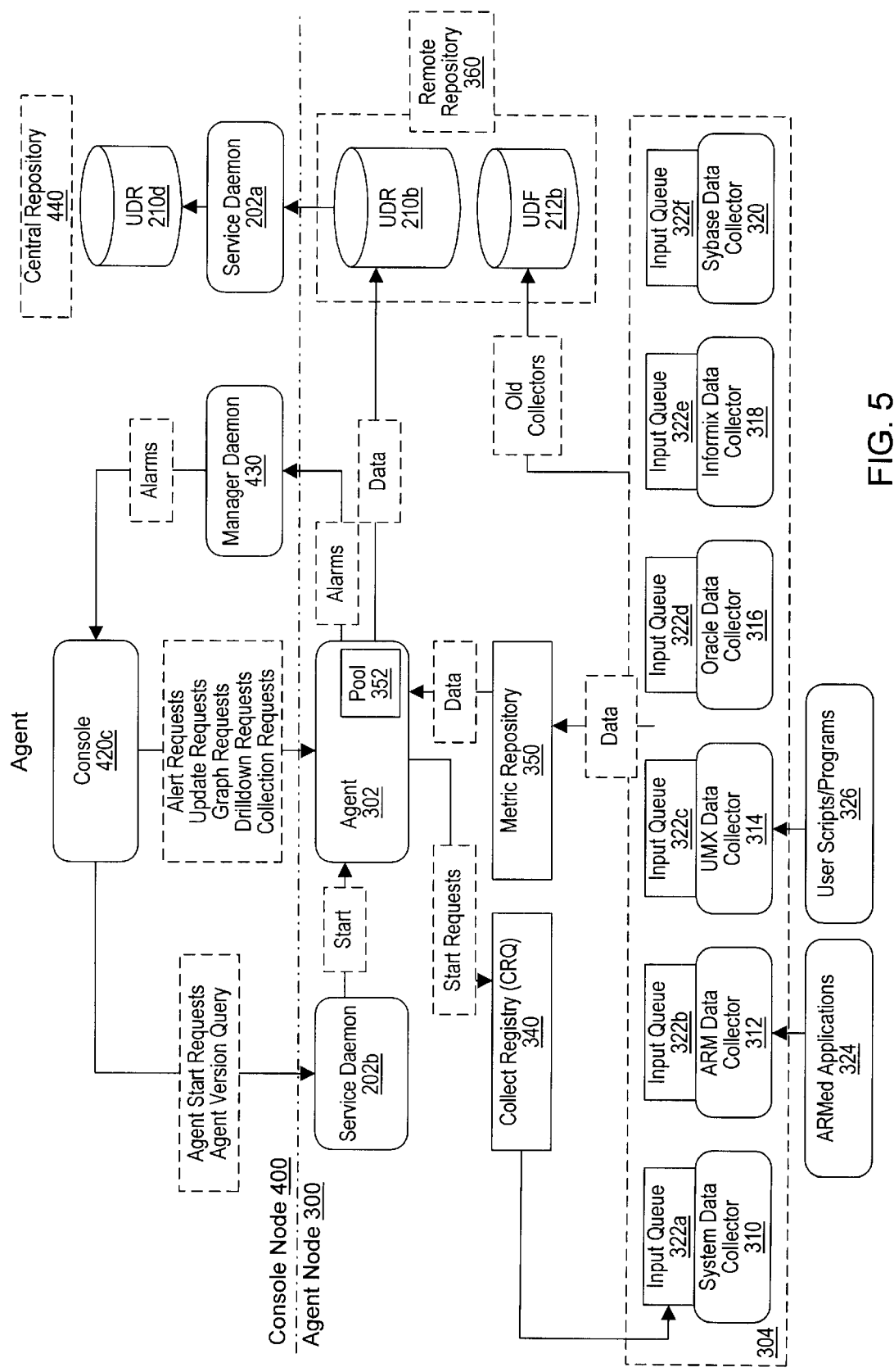
FIG. 5 is a block diagram illustrating an overview of the Agent component of the enterprise management system according to the preferred embodiment of the present invention.

FIG. 5 shows an overview of the Agent component 302 of the agent node 300 of the enterprise management system 180. In the preferred embodiment, every agent node 300 has one Agent 302. The Monitor Console 420c is another instance of the Monitor Consoles illustrated in FIG. 4 with reference numbers 420a and 420b.

When the user desires to start an Agent 302 and begin collecting data on a particular agent node 300, the user operates the Monitor Console 420c to issue an agent start request through a Service Daemon 202b. Preferably, the Service Daemon 202b is always executing on the agent node 300 in order to intercept messages from one or more Monitor Consoles 420c even when the Agent 302 is offline. In the preferred embodiment, the Service Daemon 202b is largely invisible to the user. The Service Daemon 202b also intercepts agent version queries from the Monitor Console 420c. An agent version query is a request for the current version number of the piece of software that comprises the Agent 302. As described above, the Monitor Console 420c is able to send alert requests, update requests, graph requests, and drilldown requests to the Agent 302. The Monitor Console 420c may also send collection requests, which are requests for the Agent 302 to begin collecting particular metrics or metric groups on the agent node 300.

When the Agent 302 receives a collect request from the Monitor Console 420c through the Service Daemon 202b, the Agent 302 initiates the collection through the Collect Registry Queue (CRQ) 340. The Agent 302 uses the Collect Registry Queue 340 to control and schedule data collection. By helping the Agent 302 know how many collectors 304 are running and whether the collectors 304 are each the right type, the Collect Registry Queue 340 prevents redundant collection. Each data collector 310, 312, 314, 316, 318, and 320 is designed to gather one or more metrics for the operating system and/or one or more subsystems. The present invention contemplates a variety of data collectors 304, but for illustrative purposes, the following are shown: system data collector 310 (which collects data from the operating system), ARM data collector 312 (which collects data from ARMed applications 324), UMX data collector 314 (which collects data from user scripts/programs 326), Oracle data collector 316 (which collects data from an "ORACLE" database management system), Informix data collector 318 (which collects data from an "INFORMIX" database management system), and Sybase data collector 320 (which collects data from a "SYBASE" database management system). Each of the collectors 310, 312, 314, 316, 318, and 320 has an associated input queue 322a, 322b, 322c, 322d, 322e, and 322f, respectively. The input queues 322a, 322b, 322c, 322d, 322e, and 322f store the requested metric groups and associated collection intervals for each collector 304. Although a collector 304 typically supports multiple metric groups, the collector 304 only collects those metric groups that are requested. After metric data is collected, the data is transferred to a Metric Repository 350. The Metric Repository 350 sits between the Agent 302 and the collectors 304 and provides fast interprocess communication between the Agent process. 302 and the collector processes 304.

Metric data from the Metric Repository 350 is efficiently copied into the Metric Repository Pool 352, where the data is cached by metric group, instance, and collection rate. The Metric Repository Pool 352 is located in the memory space of the Agent 302 and is invisible to everything other than the Agent 302. By storing collected data for the metric groups in a single Metric Repository Pool 352 for each Agent 302 and agent node 300, the enterprise management system 180 prevents redundant collection: whether one Monitor Console 420c or a plurality of Monitor Consoles such as 420a through 420c request data collection for a particular metric group, the data is only collected once.

In the preferred embodiment, the Collect Registry Queue 340, Metric Repository 350, Metric Repository Pool 352, input queues 322a, 322b, 322c, 322d, 322e, and 322f, and Universal Data Repository (UDR) history files 210a, 210b, 210c, and 210d comprise a data structure called a base queue or BASEQ. A BASEQ is a contiguous relocatable heap of memory: in other words, the BASEQ provides random allocation of data in a contiguous block of storage. The BASEQ provides fast interprocess communication with locking synchronization between the consumer of data and the provider of data. The BASEQ can be stored in different types of memory, such as volatile memory like RAM or nonvolatile memory like a hard disk. In the preferred embodiment, the BASEQ is implemented as a base class in an object-oriented programming environment. In this embodiment, specialized variants of the BASEQ are implemented as derived classes which inherit the properties of the base class. For example, UDR 210a, 210b, 210c, and 210d are implemented with a derived class which is located on a file on disk, while Metric Repository 350 is implemented with a derived class which is located in a shared memory segment.

In the preferred embodiment, the enterprise management system 180 provides for the storage of historical metric data as well as the monitoring of real-time metric data. Therefore, in addition to passing the metric data to the Monitor Console 420c, the Agent may also send the metric data to a Remote Repository 360 for storage. The Remote Repository 360 is located on the agent node 300, and each agent node 300 may have its own Remote Repository 360. The Remote Repository comprises a database in the Universal Data Repository (UDR) format 210b and/or a database in the Universal Data Format (UDF) format 212b. The UDF 212b is an alternative data format to the UDR 210b and is used primarily by older ones of the collectors 304. The UDR format 210b is multi-node: it can store data from multiple sources in one place. UDR 210b is also multi-rate: it can store data at a plurality of levels of varying granularity by sending data at each successive level through an intelligent summarization process according to the present invention. Historical data can also be stored in a Central Repository 440 on the console node 400. A Service Daemon 202a controls the data transfer from the Remote Repository 360 to the Central Repository 440. In the preferred embodiment, the Central Repository 440 comprises a UDR 210d.

Figure 6:
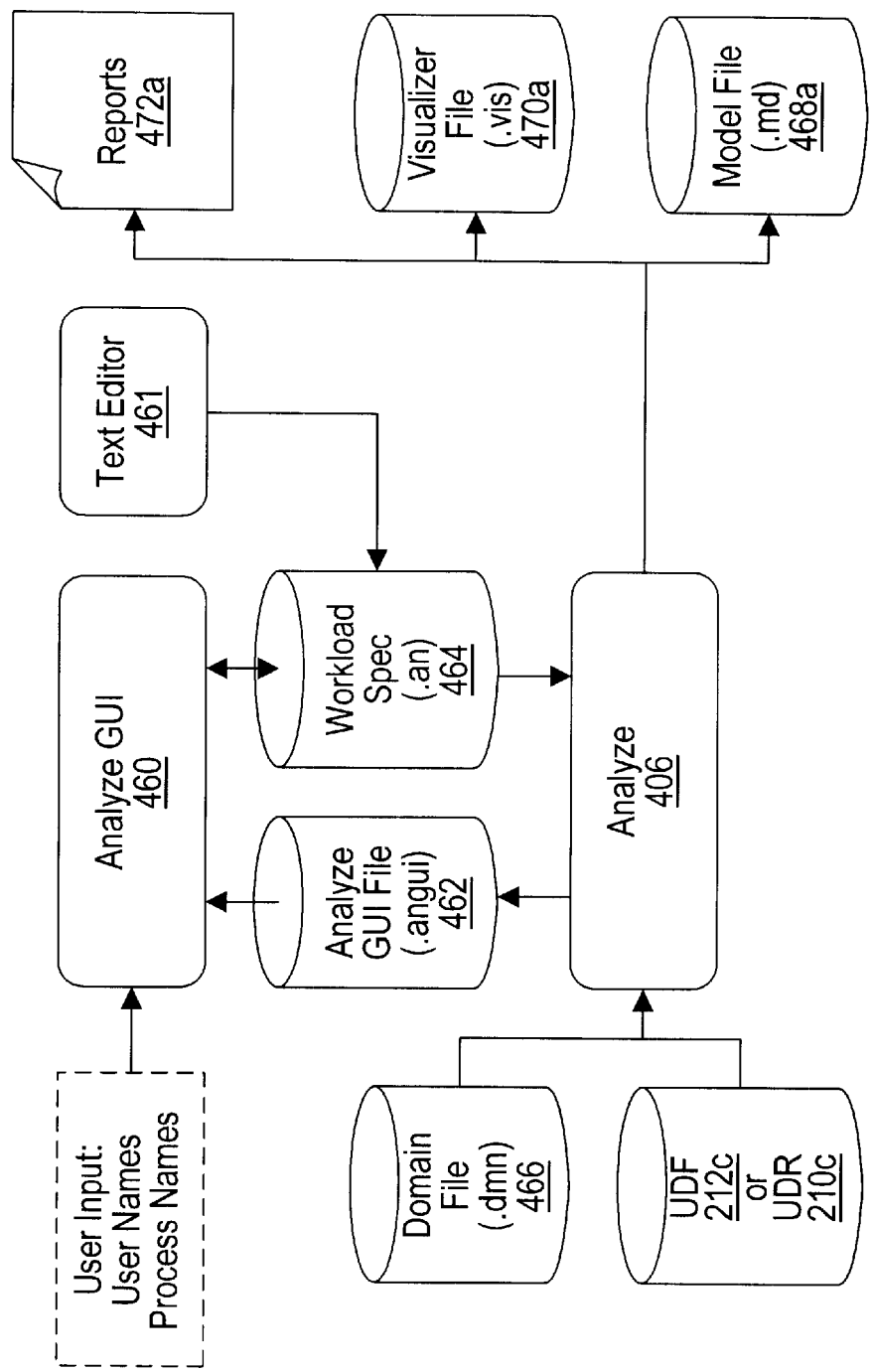
FIG. 6 is a block diagram illustrating an overview of the Analyze component of the enterprise management system according to the preferred embodiment of the present invention.

FIG. 6 illustrates an overview of the Analyze component 406 of the console node 400 of the enterprise management system 180. In the preferred embodiment, Analyze 406 comprises the "ANALYZE" portion of the "BEST/1 FOR DISTRIBUTED SYSTEMS" software package available from BMC Software, Inc. Essentially, Analyze 406 takes the data collected by one or more Agents. 302 and creates a model of one or more computer systems and the processes that run on those computer systems. In the preferred embodiment, Analyze 106 can model multi-vendor environments, system memory, multiple processors, disk drives, logical volumes, RAID devices, load balancing, ASCII and X terminals, local and remote file servers, independent and dependent transactions, client/server workloads, private and shared memory/transaction, CPU priority scheduling, networks of different types, and "ORACLE", "SYBASE", and "INFORMIX" database environments. In the preferred embodiment, Analyze 406 takes as input a domain file 466 which identifies the agent nodes 300 on the network and the relationship between them. As shown in FIG. 6, Analyze 406 also takes as input a data repository in either UDF 212c or UDR 210c format, wherein the data repository 212c or 210c is a set of metric groups collected from one or more agent nodes 300.

The Analyze user then can either use a default workload specification (.an) 464 or create his or her own, either with the supplied graphical user interface (GUI) 460 or with a standard text editor 461. A workload specification 464 includes a user name, a process name, and other information. A workload is a useful grouping of key performance metrics. For example, the user might classify a plurality of Oracle-related processes as an "Oracle" workload, a plurality of other processes as a "payroll" workload, and the remainder as a "miscellaneous" workload. From this classification data, the Analyze engine 406 creates an Analyze GUI file 462 which contains a list of processes captured within the analysis interval. The Analyze GUI file 462 is then passed to the Analyze GUI 460.

Using the Analyze GUI file 462, the domain file 466, and the UDF 212c or UDR 210c data repository, Analyze 406 can create several forms of output. First, Analyze 406 can create a model file 468a. The model file 468a is a model of the workload data as contained in UDF 212c or UDR 210c and as classified by the user through the Analyze GUI 460 and/or standard text editor 461. Second, Analyze 406 can create reports 472a, which comprise the results of user-specified queries concerning workload characteristics. For example, one instance of reports 472a could be a list of the top ten workloads sorted by total CPU usage. Third, Analyze 406 can create a Visualizer file 470a, wherein the Visualizer file 470a is a description of the characteristics of the enterprise 100 as determined by the collected metrics and the user input. The Visualizer file 470a can be read and utilized by the Visualizer tool 410. In the preferred embodiment, Visualizer 410 is the "BEST/1-VISUALIZER" available from BMC Software, Inc. With Visualizer 410, performance statistics and workloads can be graphed, compared, drilled down, and visually analyzed to pinpoint hot spots or trends to assist in resource management, system tuning, and configuration changes. Visualizer 410 preferably includes functionality known as MASF (Multivariate Adaptive Statistical Filtering).. Using standard deviation techniques, MASF continually interprets performance data and calculates normalcy. MASF graphs are thus used to discover true performance anomalies that deviate from normal performance behavior. In addition to creating Visualizer file 470*a* and reports 472*a*, Analyze 406 also generates Model files 468*a* for performance prediction of the system within an enterprise computing environment 100.

Figure 7:
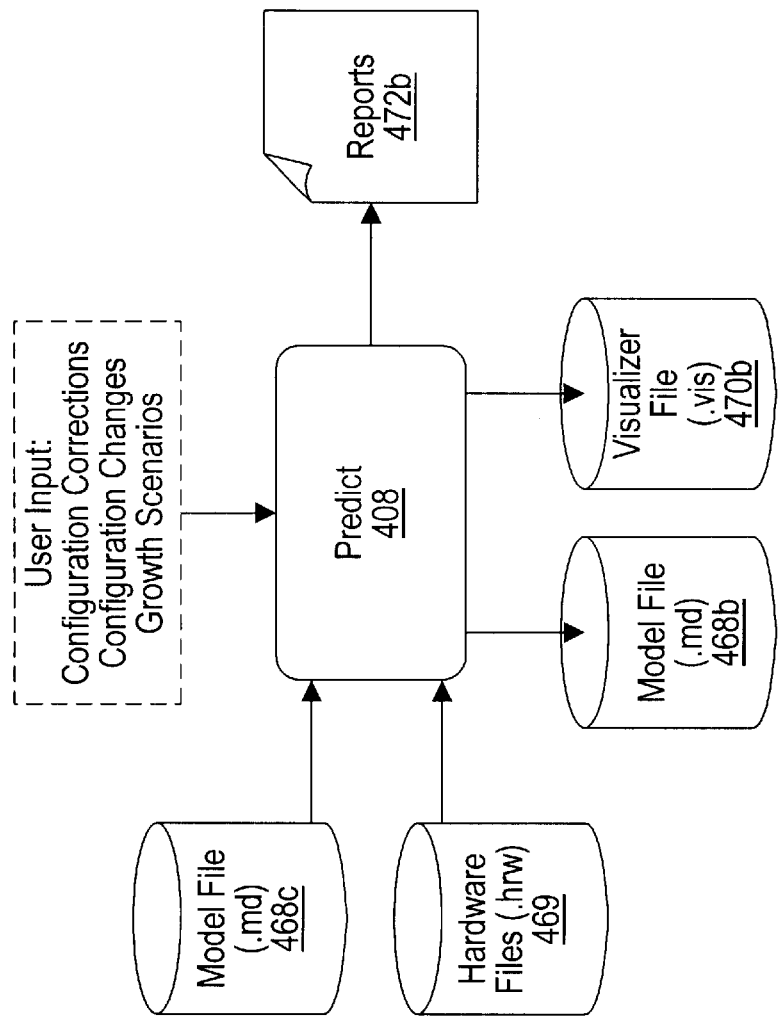
FIG. 7 is a block diagram illustrating an overview of the Predict component of the enterprise management system according to the preferred embodiment of the present invention.

FIG. 7 shows an overview of the Predict component 408 of the console node 400 of the enterprise management system 18.0. In the preferred embodiment, Predict 408 comprises the "BEST/1-PREDICT" component of the "BEST/1 FOR DISTRIBUTED SYSTEMS" software package available from BMC Software, Inc. Predict 408 is a planning tool which forecasts the impact of hypothetical changes on elements of the enterprise 100 such as disparate hardware, software, applications, and databases. Predict 408 takes the workload data from a Model File 468*c*, such as the Model File 468*a* generated by Analyze 406, and computes performance statistics such as workload response times, utilization, and throughputs at CPUs, disks, networks, and other elements of the enterprise computing environment 100. Thus, Predict 408 constructs a baseline model from collected data that represents the essence of the system under management. The user can also operate Predict 408 to construct the baseline model from pre-built model components, or from a combination of collected data and pre-built components. Preferably, Predict 408 uses a graphical user interface (GUI) for user input and information display.

After the baseline model has been constructed, the user can- modify the baseline model by specifying configuration corrections, configuration changes, and/or growth scenarios. With Predict 408, the user can change one or more attributes of any model, creating "what if?" or hypothetical scenarios. By using methods, modeling techniques, and statistical formulas taken from queuing theory, Predict 408 accurately determines the impact of these workload and configuration changes on performance and response time. As one of the results of "what if?" computation, the changes to the baseline are displayed as unitless, numerical response time values relative to the baseline value of one. In the preferred embodiment, response times are broken down into four key components: CPU service time and wait time, I/O service time and wait time, network service time and wait time, and wait time for transactions running on external systems. Using the four key components, Predict 408 also preferably calculates other critical performance metrics such as throughput rates, CPU queue lengths, disk queue lengths, paging rates, and the amount of memory required to eliminate excessive paging.

Predict 408 preferably includes a multivendor hardware table 469, wherein the table includes the hardware specifications that Predict 408 uses to calculate the performance of hypothetical changes to the enterprise 100. Therefore, changes to CPU, memory, I/O, priorities, transaction rates, and other attributes can be evaluated across a plurality of heterogeneous computer systems 150. Furthermore, in modeling the configuration and workload changes across multiple systems, Predict 408 automatically calculates interaction and interference between systems. Predict 408 also preferably provides scenario planning, or modeling incremental growth over time, in order to determine the life expectancy of computing resources and the point at which resources should be upgraded to ensure that performance remains at an acceptable level. In the various ways set forth above, Predict 408 thus permits a user to plan for the future by "test driving" both actual and alternative or hypothetical configurations of the enterprise. 100.

Like Analyze 406, Predict 408 can generate reports 472*b*, a Visualizer file 470*b*, and a model file 468*b*. The model file 468*b* can be modified and passed back to Predict 408 for additional modeling.

Collecting, Sampling, and Statistically Recreating Metric Data

Performance measurement is the process of gathering data concerning the state of the hardware and/or software of a computer system. In one embodiment, system software and/or data collectors 304 continually monitor one or more elements of the computer system and collect raw metric data relating to system performance, preferably at a high frequency. The metric data is written to a memory and periodically updated. The memory is preferably a registry of metrics. Often, different metrics are not updated at the same time or in the same interval. However, it is assumed that the raw data in the registry accurately reflects the system state of interest.

In a preferred embodiment, data in the registry is not used directly. Rather, the data is periodically sampled from the registry of metrics indirectly through the process of second-hand sampling. Such second-hand sampling is preferably performed less frequently than the frequency at which data is collected and placed into the registry of metrics. Because second-hand sampling itself uses system resources such as I/O, storage space, and CPU time, it is impractical and inefficient to sample the registry of metrics at a very high frequency: that is, at a frequency nearing the usually high frequency at which raw data is written to the registry of metrics. On the other hand, if data is sampled from the registry too infrequently, then a model created with the second-hand data may not be as accurate as desired. For example, significant short-lived events and/or processes can be missed altogether if the interval between samples is too large. Infrequent sampling may therefore distort a model of a system's performance. The degree to which the sampled data reliably reflects the raw data determines the usefulness of the performance model for system capacity planning. The degree of reliability also determines the usefulness of the performance statistics presented to end-users by performance tools.

Sensitivity to sampling frequency varies among data types. Generally, performance data can be classified into three categories: cumulative, transient, and constant. Cumulative data is data that accumulates over time. For example, a system CPU time counter may collect the total number of seconds that a processor has spent in system state since system boot. With transient data, old data is replaced by new data. For example, the amount of free memory is a transient metric which is updated periodically to reflect the amount of memory not in use. However, values such as the mean, variance, and standard deviation can be computed based on a sampling history of the transient metric. The third type of performance data, constant data, does not change over the measurement interval or lifetime of the event. For example, system configuration information, process ID, and process start time are generally constant values. Of the three data types, transient performance metrics are the most sensitive to variations in the sample interval and are therefore the most likely to be characterized by uncertainty. For example, with infrequent sampling, some state changes may be missed completely. However, cumulative data may also be rendered uncertain by infrequent sampling, especially with regard to the variance of such a metric.

The following table contains a nonexhaustive list of examples of major performance metrics and their data types. The table also presents guidelines as to how often the metrics should preferably be sampled.

| METRIC | DATA TYPE | SAMPLE RATE (SEC) |
| --- | --- | --- |
| Disk queue length | Cumulative | 5 to 15 |
| CPU queue length | Cumulative | 5 to 15 |
| I/O counts | Cumulative | 5 to 15 |
| Number of processes | Cumulative | 5 to 15 |
| Memory in use | Transient | 1 to 3 |
| Memory size | Constant | 3600 |
| Disk busy time | Transient | 1 to 3 |
| In (out) network packets | Cumulative | 5 to 15 |
| Number of bytes in a packet | Cumulative | 5 to 15 |

Performance data is collected according to a measurement structure, wherein the measurement structure comprises a measurement interval and sample interval or number of samples. The measurement interval or collection interval L is a continuous time segment during which raw performance data is collected. The measurement interval is delineated by its beginning time and its ending time. The sample interval Δ is the time between two consecutive samples. In the preferred embodiment, the sample interval is a constant value. The number of samples n is the total number of samples taken during the measurement interval. The relationship among these three parameters is:

$$L=(n-1)\Delta.$$

The events being sampled may include, for example, process lifetimes, process types, or disk access times, or any other performance metrics that can be monitored. Although this description addresses in detail examples such as CPU utilization, process lifetime, and process type, the system and method can be applied to any metric. As used herein, "process" refers to an executing program, a task, a thread, or any other unit of execution.

Figure 8:
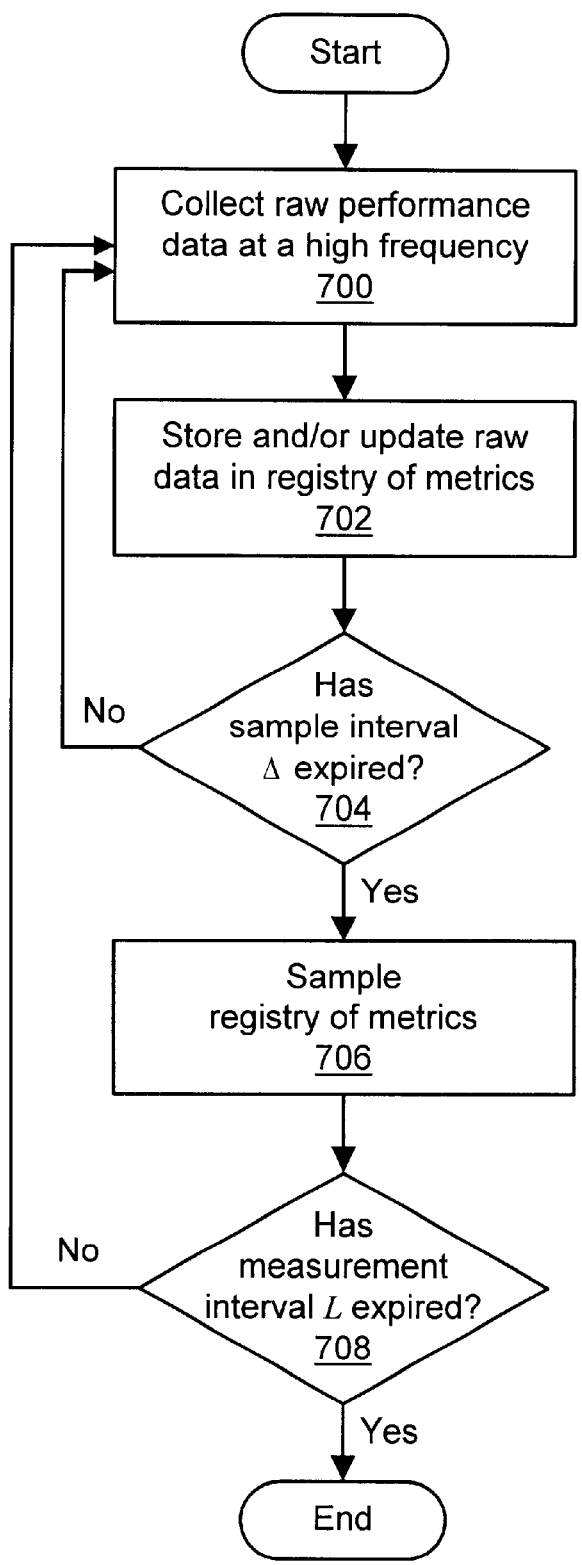
FIG. 8 is a flowchart illustrating an overview of the collection and sampling of metric data.

FIG. 8 is a flowchart illustrating an overview of the collection and sampling of metric data. In step 700 raw performance data is collected by system software or data collectors 304 at a high frequency. The raw performance data relates to one or more processes on one or more computer systems or networks. In step 702 the raw data points are stored and/or updated in the registry of metrics. As shown in step 704, the collecting and updating steps 700 and 702, respectively, are performed for as long as the sample interval Δ has not expired. When the sample interval has expired, in step 706 the registry of metrics is sampled. The sampling creates a set of sampled data points. As shown in step 708, steps 700, 702, 704, and 706 are performed repetitively as long as the measurement interval L has not expired. When the measurement interval L has expired, the collection and sampling end.

For performance modeling, two measurements are often key: the duration of an event (e.g., a process), or its service time; and the number of events, which is equivalent to the arrival rate times the length of the measurement interval. Reducing the uncertainty associated with these two key measurements is a goal of the system and method set forth in this description. If a process record is created at the time when the process is created and if the process is sampled at least once, then the exact starting time (i.e., birth) of the process can usually be obtained. Furthermore, if the ending time (i.e., death) of the process is also recorded and the record is sampled at least once, then the exact length of the process (i.e., the process lifetime) can be computed. In most systems, however, the ending time record is not kept, and therefore the exact ending time and length of the process are unknown. Therefore, other methods must be used to estimate the ending time and the process length.

Uncertainty arises from two primary sources: the unsampled segment of a seen event or process, and the unseen, short-lived event or process. FIG. 9 is a diagram illustrating an unsampled segment of a seen event. The horizontal line designated "Time" indicates increasing time from left to right. The timeline encompasses all or part of the measurement interval L. The vertical lines labeled $s_{(il)-2}$ through $s_{(im_i)+3}$ indicate samples taken at a constant sample interval Δ. The event or process 610 begins at the point in time $b_i$ and ends at the point in time $d_i$. The process 610 begins after sample $s_{(il)-1}$ but before sample $s_{il}$, so the process 610 is not detected at the point in time $b_i$ when it begins. However, the process 610 is still executing when sample $s_{il}$ is taken, so the existence of this process 610 is known at that point. In other words, the process 610 is a seen process or a known process as soon as the first sample $s_{il}$ is taken. Furthermore, in a preferred embodiment, the starting time $b_i$ of the process 610 is also determined when the process 610 is detected at sample $s_{il}$. After it has first been sampled, the process 610 continues executing for an indefinite period of time, as indicated in FIG. 9 by broken lines, wherein the process lifetime may or may not encompass additional samplings of the process 610 at regular sample intervals. The last sampling of the process 610, and therefore the last time the process 610 is seen, is the $m_i$th sample at the point in time $s_{im_i}$. The present invention contemplates that a seen process may be sampled only once, and thus that $s_{il}=s_{im_i}$ in some cases. The process 610 stops executing at the point in time $d_i$, after $s_{im_i}$ but prior to $s_{(im_i)+1}$. In the preferred embodiment, however, no record is kept of the termination of the process 610, and so the length of the process 610 after $s_{im_i}$ is unknown. Therefore, the known, captured, or sampled length 612 of the seen process 610 is represented by the difference between $s_{im_i}$ and $b_i$. The unsampled or unknown length 614 of the seen process 610 is represented by the difference between $d_i$ and $s_{im_i}$. The unsampled segment 614 is also known as the residual process time. The captured utilization is the sampled length 612 divided by the measurement interval L.

FIG. 10 is a diagram illustrating an unseen event. Again, the horizontal line designated "Time" indicates increasing time from left to right and encompasses all or part of the measurement interval L. The vertical lines labeled $s_0$ through $s_3$ indicate samples taken at a constant sample interval Δ. The event or process 620 begins at the point in time $b_i$ and ends at the point in time $d_i$. In this instance, however, the process 620 begins and ends within the sample interval Δ and between two samples. Therefore, the process 620 is unseen and its length is known only to be less than Δ. The unseen length 622 is represented by the difference between $d_i$ and $b_i$.

Figure 11:
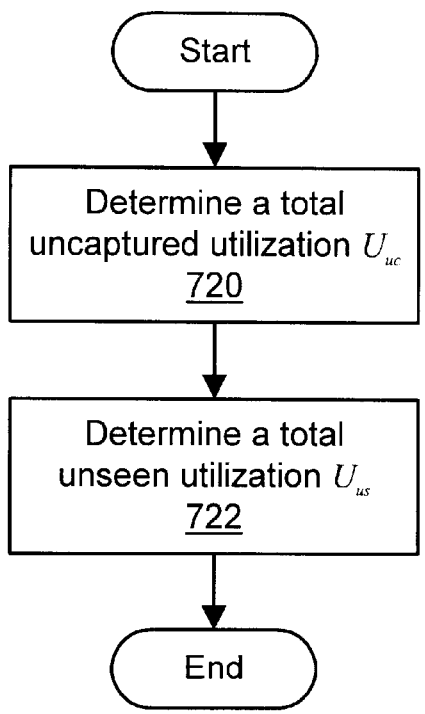
FIG. 11 is a flowchart illustrating an overview of the estimation of metric data statistics.

For a computer system or plurality of systems with hundreds or thousands of processes starting and ending within a measurement interval, the uncertainty adds up rapidly and can distort a performance model. However, statistical methods according to the present invention can provide estimations of the uncertain data, thus recreating the lost data and reducing uncertainty. FIG. 11 is a flowchart illustrating an overview of the statistical estimation of metric data. The difference between the "actual" total utilization and the "sampled" total utilization—in other words, the uncertainty—can be distributed both to the unsampled segments of the seen events or processes and to the unseen events or processes. Accordingly, in step 720 of FIG. 11 the total uncaptured utilization $U_{uc}$ is estimated. $U_{uc}$ represents an estimate of the total unsampled utilization of all seen processes over the measurement interval L. In step 722 the total unseen utilization $U_{us}$ is estimated. $U_{us}$ represents an estimate of the total utilization of all unseen processes for the measurement interval L.

Figure 12:
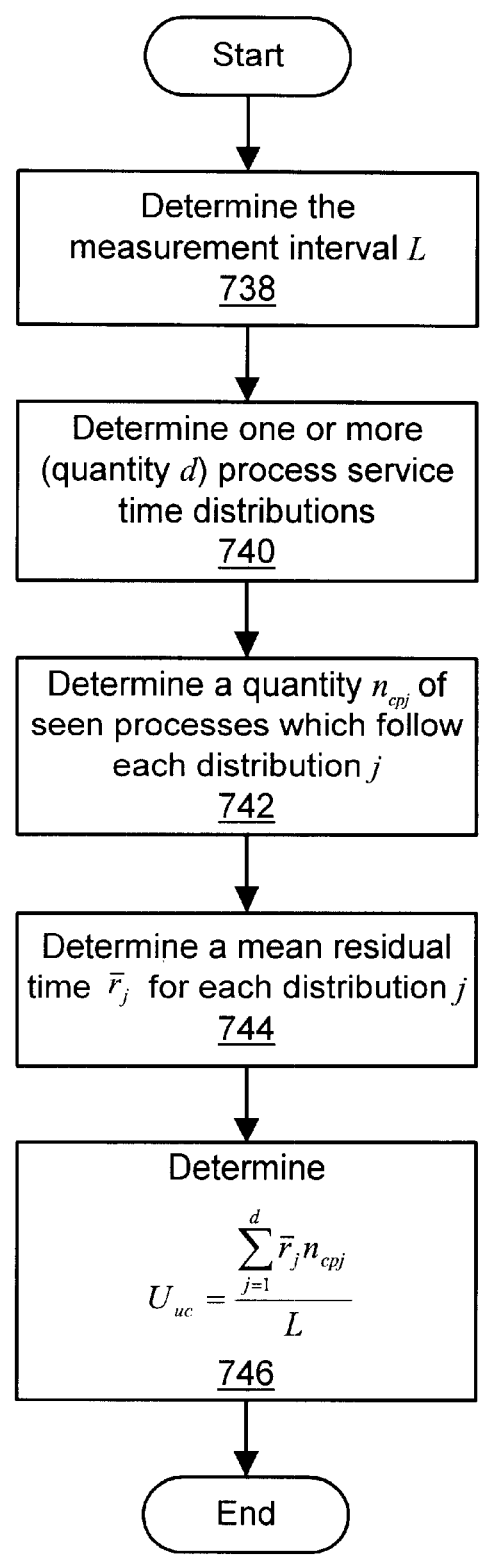
FIG. 12 is a flowchart illustrating the determination of the total uncaptured utilization.

FIG. 12 is a flowchart illustrating the determination of the total uncaptured utilization $U_{uc}$. In step 738 the measurement interval L is determined. The steps thereafter are performed for measurements within the interval L. In step 740 one or more process service time distributions are determined, wherein the quantity of distributions is labeled d. A process service time distribution is a statistical distribution which determines the duration of one or more processes. In step 742 the quantity $n_{cp}$ of seen processes which follow each distribution is determined. In other words, in steps 740 and 742 the seen processes are divided into d groups, wherein each group represents processes that are characterized by the same process service time distribution.

In step 744 a mean residual time is determined for each process service time distribution j. The mean residual time $\bar{r}_j$ represents the average expected difference $d_i-s_{im_i}$ for all the processes which are characterized by the same process service time distribution j. In other words, the mean residual time $\bar{r}_j$ represents the average unsampled length related to the unsampled segment 614.

In step 746 the total uncaptured utilization $U_{uc}$ is determined according to the following equation:

$$U_{uc} = \frac{\sum_{j=1}^{d} \bar{r}_j n_{cpj}}{L},$$

wherein d is the number of process service time distributions, $\bar{r}_j$ is the mean residual time for each distribution j, $n_{cpj}$ is the number of seen processes for each distribution j, and L is the measurement interval. In other words, the total uncaptured utilization $U_{uc}$ is the sum of the products of the mean residual time and the number of seen processes for each distribution, all divided by the measurement interval. If there is only one process service time distribution, however, then the total uncaptured utilization $U_{uc}$ can be determined according to a simplified equation:

$$U_{uc} = \frac{\bar{r} n_{cp}}{L},$$

wherein $\bar{r}$ is the mean residual time for the distribution, $n_{cp}$ is the number of seen processes for the distribution, and L is the measurement interval.

Figure 13:
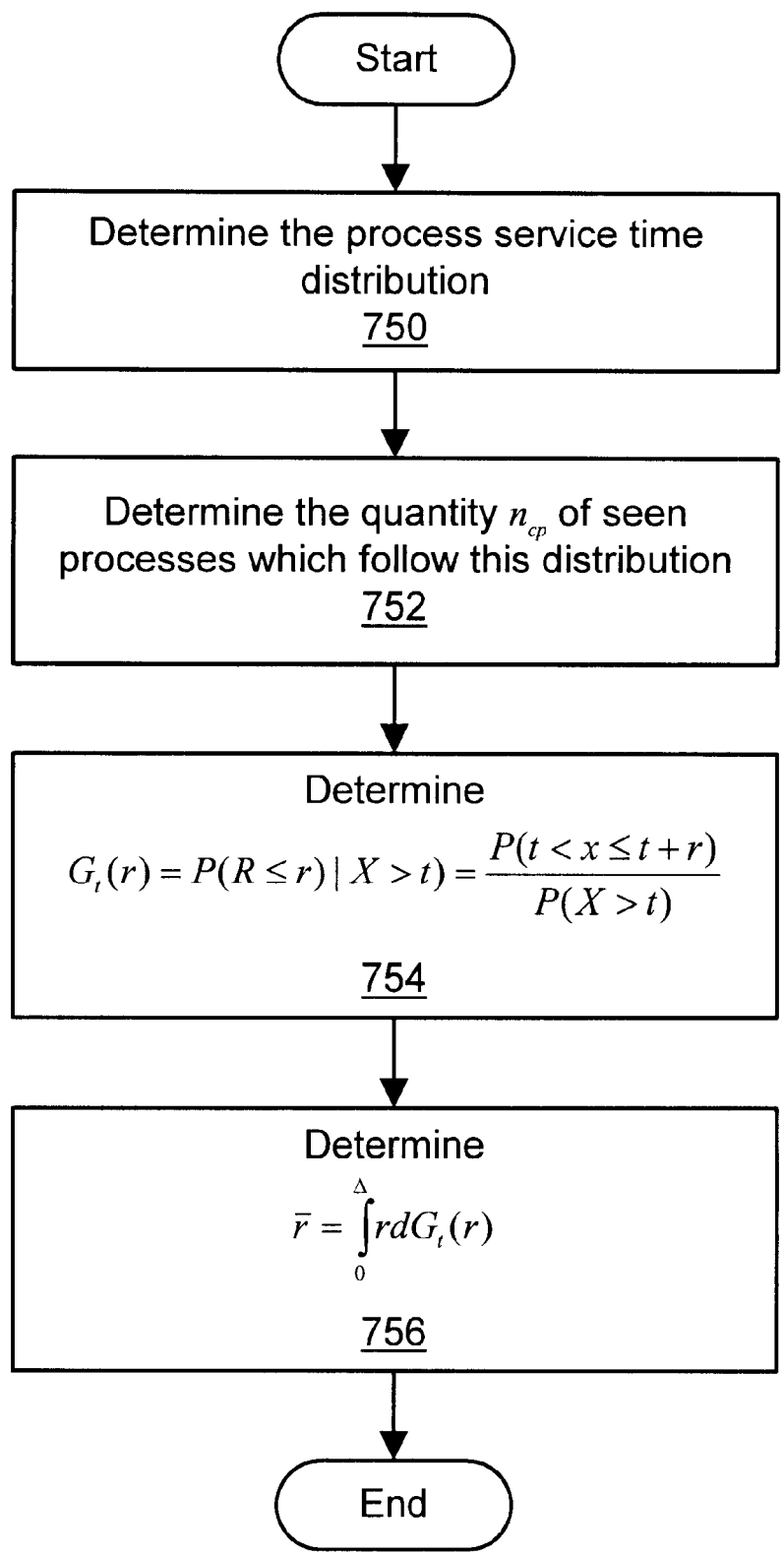
FIG. 13 is a flowchart further illustrating the determination of the total uncaptured utilization.

FIG. 13 illustrates the general determination of the total uncaptured utilization $U_{uc}$ for any process service time distribution. In step 750 the process service time distribution is determined. In step 752 the quantity $n_{cp}$ of seen processes which follow this distribution is determined.

In step 754 the conditional probability $G_t(r)$ of residual time $R \leq r$, given that the process time $X > t$, is determined as follows:

$$G_t(r) = P(R \leq r) \mid X > t) = \frac{P(t < x \leq t+r)}{P(X > t)},$$

wherein t is the last sample time and r is the unsampled segment length.

In step 756 the mean residual time $\bar{r}$ for this distribution is determined according to the following equation:

$$\bar{r} = \int_0^\Delta r \, dG_t(r),$$

wherein $\Delta$ is the sample interval. With steps 750 through 756, the system and method are applicable to any process service time distribution. Nevertheless, a discussion of several exemplary distributions follows.

Figure 14:
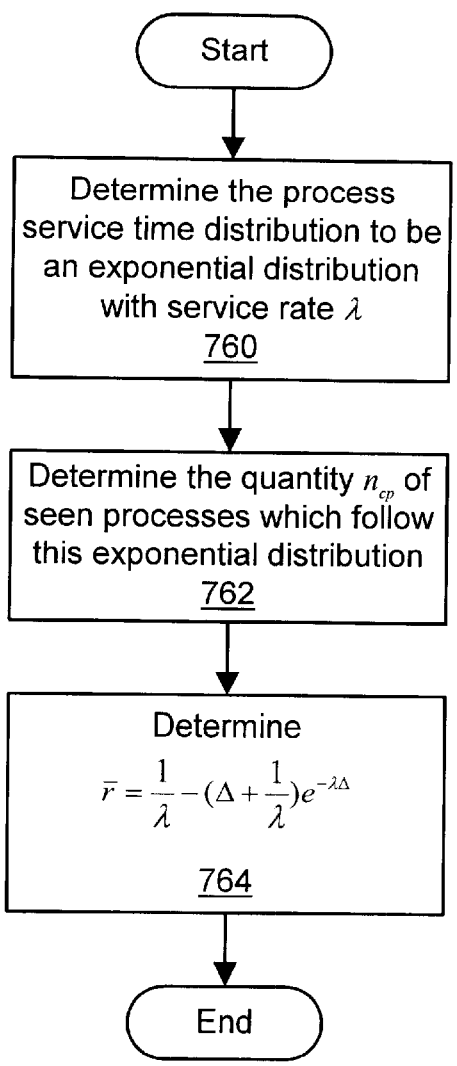
FIG. 14 is a flowchart illustrating the determination of the portion of the total uncaptured utilization for an exponential distribution.

FIG. 14 is a flowchart illustrating the determination of the portion of the total uncaptured utilization for an exponential distribution. In step 760 the process service time distribution is determined to be an exponential distribution with service rate $\lambda$. In step 762 the quantity $n_{cp}$ of seen processes which follow the exponential distribution with service rate $\lambda$ is determined. In step 764 the mean residual time $\bar{r}$ for the exponential distribution is determined according to the following equation:

$$\bar{r} = \frac{1}{\lambda} - \left(\Delta + \frac{1}{\lambda}\right) e^{-\lambda \Delta},$$

wherein $\Delta$ is the sample interval.

Figure 15:
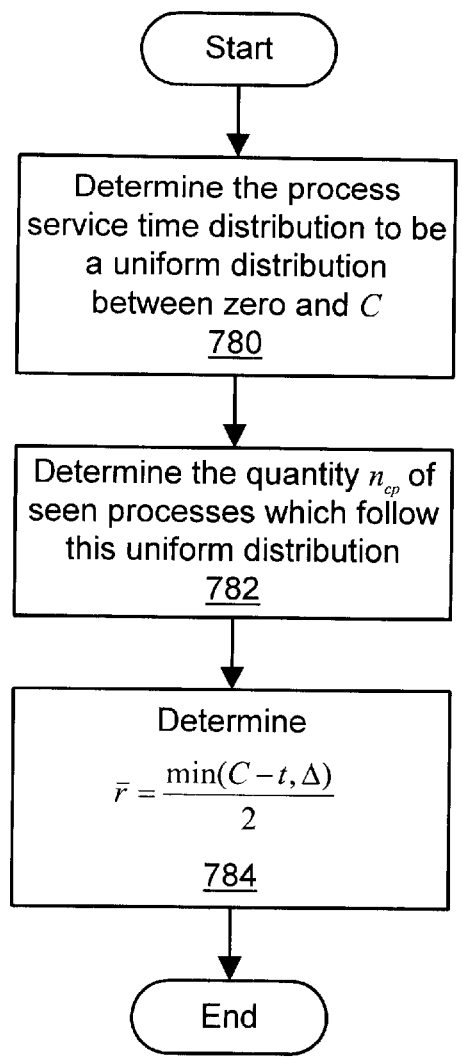
FIG. 15 is a flowchart illustrating the determination of the portion of the total uncaptured utilization for a uniform distribution.

FIG. 15 is a flowchart illustrating the determination of the portion of the total uncaptured utilization for a uniform distribution. In step 780 the process service time distribution is determined to be a uniform distribution between zero and a constant C. In step 782 the quantity $n_{cp}$ of seen processes which follow the uniform distribution between zero and C is determined. In step 784 the mean residual time $\bar{r}$ for the uniform distribution is determined according to the following equation:

$$\bar{r} = \frac{\min(C-t, \Delta)}{2},$$

wherein t is the average difference between the last sampling time and the beginning time (i.e., the average sampled length if the measurement interval is normalized to 1) for the seen processes which follow the uniform distribution between zero and C, and thus wherein $0 \leq t \leq C$, and wherein $\Delta$ is the sample interval. The mean residual time for the uniform distribution depends upon the sampled process time: the more time that has already been captured, the less the expected residual time.

Figure 16:
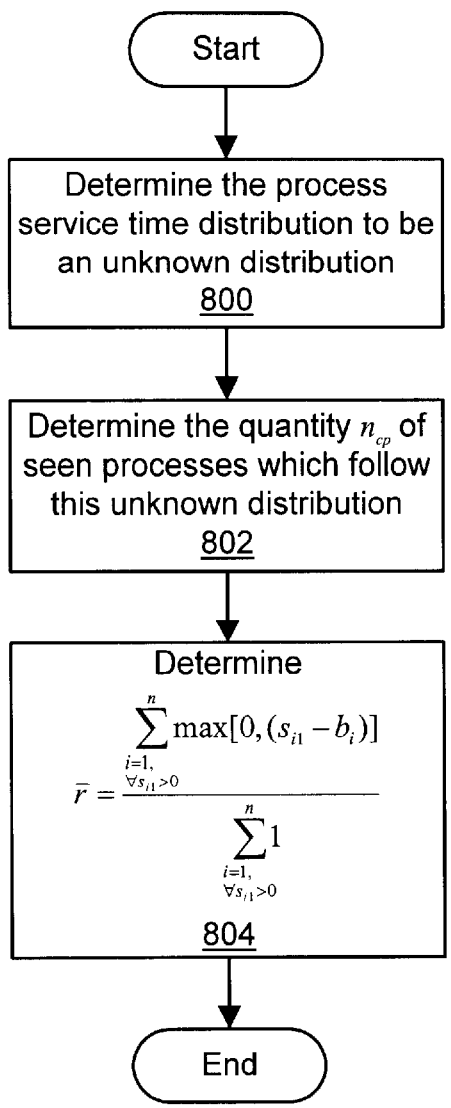
FIG. 16 is a flowchart illustrating the determination of the portion of the total uncaptured utilization for an unknown distribution.

FIG. 16 is a flowchart illustrating the determination of the portion of the total uncaptured utilization for an unknown distribution. In step 800 the process service time distribution is determined to be an unknown distribution. In step 802 the quantity $n_{cp}$ of seen processes which follow the unknown distribution is determined. In step 804 the mean residual time $\bar{r}$ for the unknown distribution is determined according to the following equation:

$$\bar{r} = \frac{\sum_{\substack{i=1, \\ \forall s_{il} > 0}}^{n} \max[0, (s_{il} - b_i)]}{\sum_{\substack{i=1, \\ \forall s_{il} > 0}}^{n} 1},$$

wherein n is the total quantity of processes, $s_{il}$ is the first sampling time for each process i, $s_{il}=0$ for an unseen process, and $b_i$ is a beginning time for each process i. The rationale for the equation is that the residual time mirrors $s_{il}-b_i$, the process time prior to the first sample time.

Figure 17:
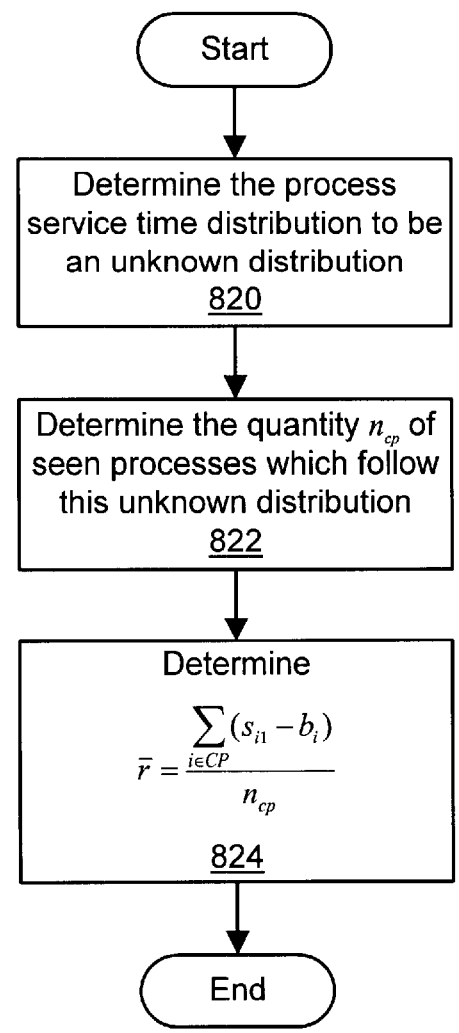
FIG. 17 is a flowchart illustrating an alternative method of the determination of the portion of the total uncaptured utilization for an unknown distribution.

FIG. 17 is a flowchart illustrating an alternative method of the determination of the portion of the total uncaptured utilization for an unknown distribution. In step 820 the process service time distribution is determined to be an unknown distribution. In step 822 the quantity $n_{cp}$ of seen processes which follow the unknown distribution is determined. In step 824 the mean residual time $\bar{r}$ for the unknown distribution is determined according to the following equation:

$$\bar{r} = \frac{\sum_{i \in CP}(s_{il} - b_i)}{n_{cp}},$$

wherein CP is a set of all seen processes which follow the unknown distribution, $s_{il}$ is the first sampling time for each seen process $i \in CP$, and $b_i$ is the beginning time for each process $i \in CP$. The rationale for the equation is that the residual time mirrors $s_{il}-b_i$, the process time prior to the first sample time.

Figure 18:
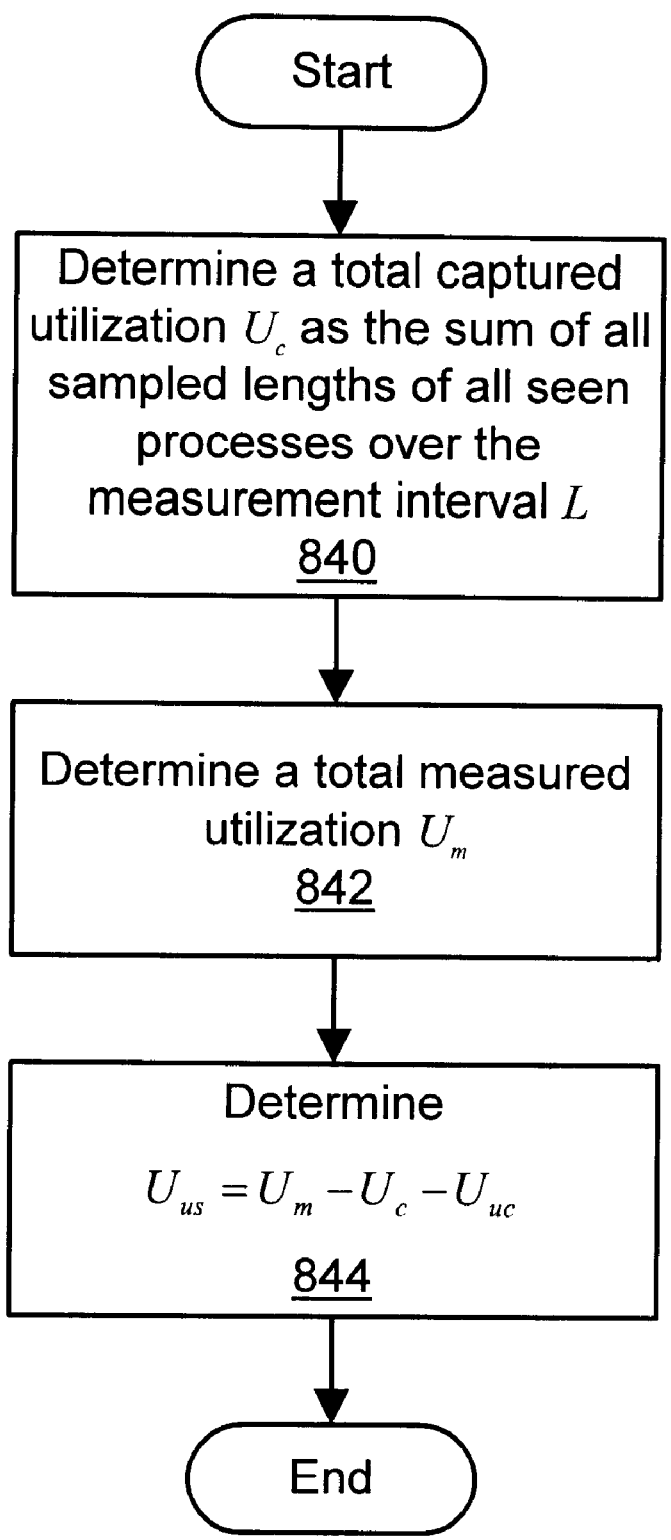
FIG. 18 is a flowchart illustrating the determination of the total unseen utilization.

FIG. 18 is a flowchart illustrating the determination of the total unseen utilization. In step 840 a total captured utilization $U_c$ is determined. The total captured utilization $U_c$ is the sum of the sampled lengths of all seen processes over the measurement interval L and can be computed as follows:

$$U_c = \frac{\sum_{i \in CP}(s_{im_i} - b_i)}{L},$$

wherein CP is a set of all seen processes, $S_{im_i}$ is the last sampling time for each seen process $i \in CP$, $b_i$ is the beginning time for each seen process $i \in CP$, and L is the measurement interval.

In step 842 a total measured utilization $U_m$ is determined. The total measured utilization represents the total utilization of all processes of interest, seen and unseen, over the measurement interval L. Step 842 assumes that universal utilization statistics are available from the registry of metrics, system software, or other monitoring software. In step 844 the total unseen utilization $U_{us}$ is determined according to the following equation:

$$U_{us} = U_m - U_c - U_{uc}.$$

In other words, the uncertainty is the difference between the "actual" utilization $U_m$ and the "sampled" utilization $U_c$. The uncertainty (i.e., $U_m - U_c$) is the sum of the uncaptured utilization $U_{uc}$ and the unseen utilization $U_{us}$, so the unseen utilization $U_{us}$ can be determined once the uncaptured utilization $U_{uc}$ and the uncertainty are known. As discussed above, FIG. 12 illustrates how the uncaptured utilization $U_{uc}$ can be computed in one embodiment.

If, however, universal utilization statistics are not available, then the total measured utilization $U_m$ cannot easily be determined. Nevertheless, the total unseen utilization $U_{us}$ may still be determined according to an iterative method which is described as follows. The following method is also useful when the processes of interest do not represent all the activity on the computer system. If so, it is assumed that the processes are marked in such a way that it can be determined which ones are of interest. Furthermore, it is assumed in all cases that the start time of processes is independent of the sample time. Therefore, if there are very many short-lived processes, then a certain percentage of them will be seen. Because the percentage of short-lived, seen processes can be estimated as described below, the total number of unseen processes can be estimated as well.

Figure 19:
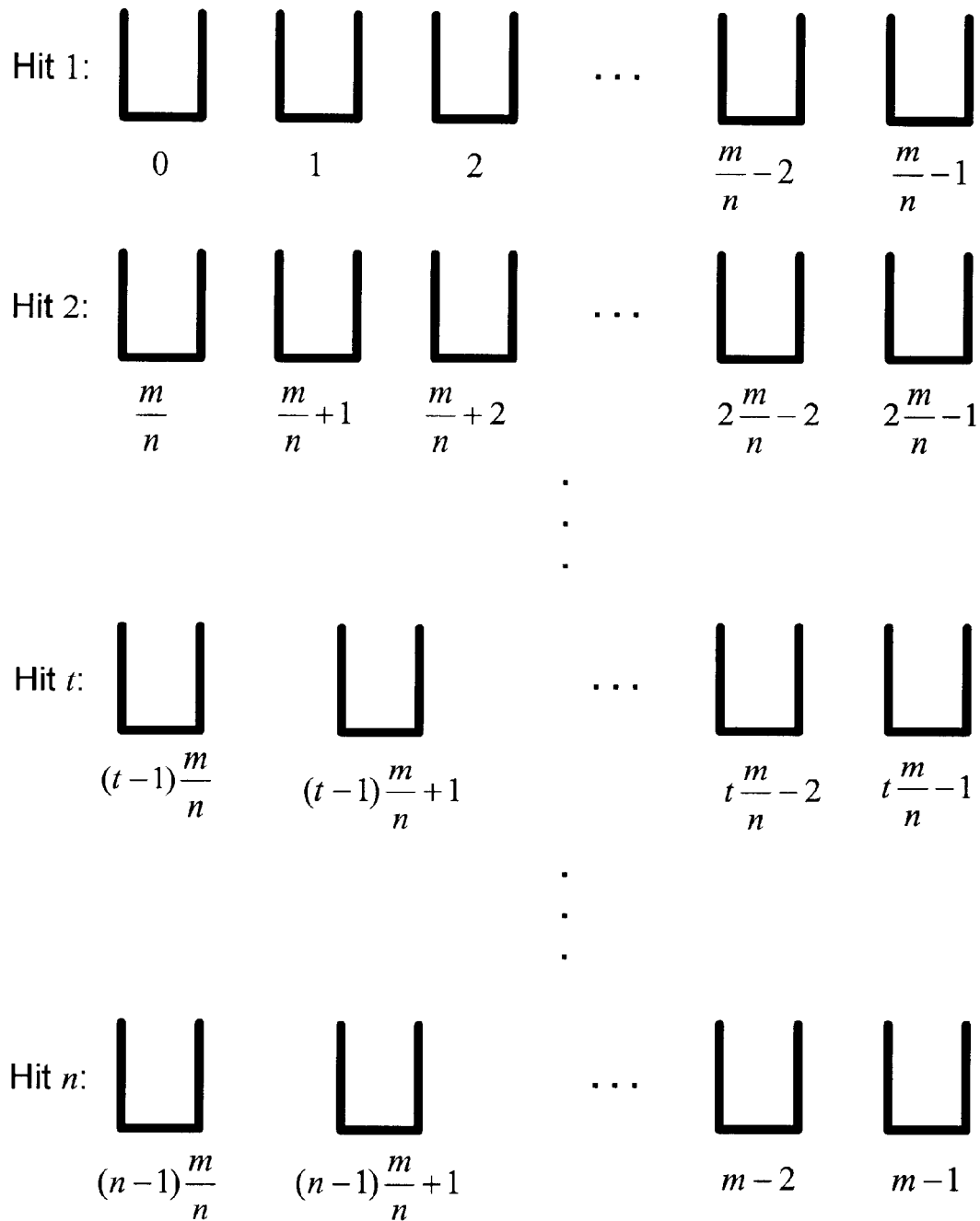
FIG. 19 illustrates a matrix of buckets used in the estimation of the total unseen utilization.

The iterative method for determining the number of unseen processes will function for any sample interval. For simplicity of computation, however, let the sample interval $\Delta = 1$. Application of the iterative method to a sample interval $\Delta \neq 1$ will be readily apparent to one skilled in the art. First, the seen processes are placed into a quantity of buckets. In a computer-implemented version of this method, a bucket would preferably be a memory location, and the plurality of buckets would preferably be an ordered plurality of memory locations such as a matrix, one-dimensional array, linked list, or other ordered data structure. The quantity of buckets is m×n, wherein n is the maximum number of times that any process has been sampled or hit, and wherein m is an arbitrary multiple of n. Preferably, m should be chosen such that there will be, on average, at least 20 processes in each bucket. The m buckets are divided evenly into n groups, as illustrated by FIG. 19.

A process is placed in one of the buckets in the tth row, wherein t is the number of times the process was sampled or hit. Within each row, the buckets represent $$\frac{m}{n}$$

segments of the sample interval $\Delta$. A process sampled t times and starting within the ith segment of the sample interval is placed into the bucket labeled with the following value:

$$(t-1)\frac{m}{n} + i, \text{ wherein } i = 0, 1, \ldots, \frac{m}{n} - 1.$$

Figure 20:
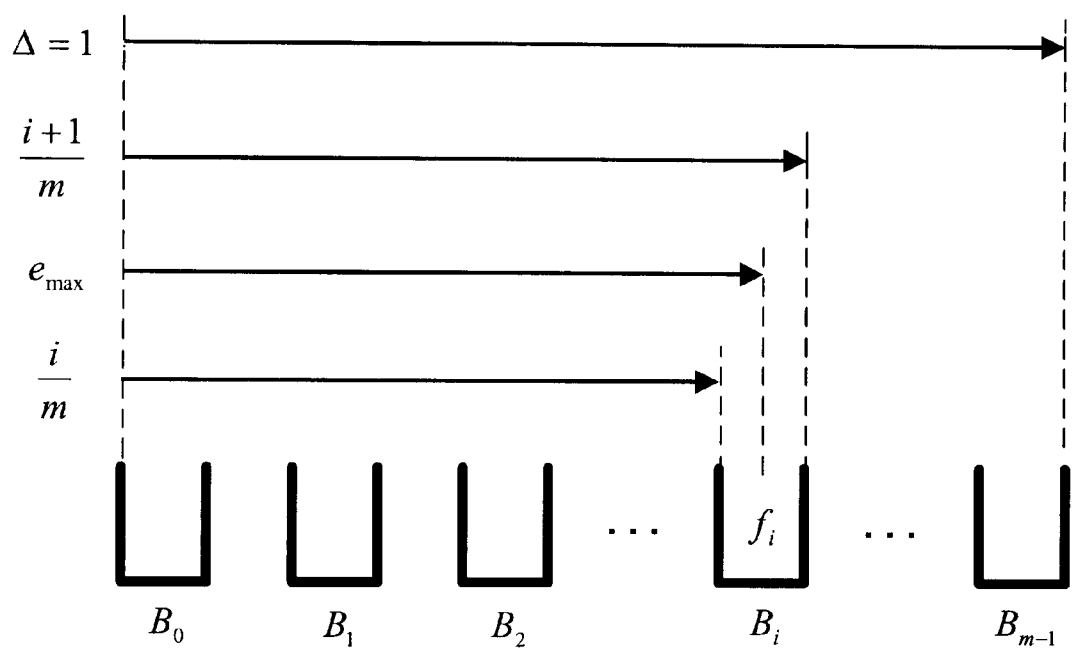
FIG. 20 illustrates a specific example of the estimation of the total unseen utilization with buckets.

For example, let the maximum observed time for a process be $e_{max} < 1$. Because $e_{max} < \Delta$, no process can be seen more than once, and thus n=1. A derivative assumption is that no process lives longer than $e_{max}$; otherwise, a longer-lived process probably would have been seen. FIG. 20 illustrates this example with m buckets labeled $B_0$ through $B_{m-1}$. Thus, the last non-empty bucket will be bucket $B_i$, where i is the smallest integer that is greater than or equal to $e_{max} \times m - 1$, i.e., i is the ceiling of $e_{max} \times m$, denoted by $\lceil e_{max} \times m \rceil$. In other words, $e_{max} m - 1 \leq i < e_{max} m$. As shown in FIG. 20, all of the processes in bucket $B_i$ will have length between $$\frac{i}{m}$$

and $e_{max}$.

Let bucket $B_i$ have a quantity of processes $f_i$ of length between $$\frac{i}{m}$$

and $e_{max}$. The assumption of uniformity of start time implies that some processes of length between $$\frac{i}{m}$$

and $e_{max}$ will not be seen at all because they began and terminated too early, and that others of the same length will have been placed in other buckets because they started closer to the sampling time and continued to live afterwards. In fact, for any $\alpha < e_{max}$, the number of processes that start between $\alpha$ and $$a + \frac{i}{m}$$

after a sample is taken and have length between $$\frac{i}{m}$$

and $e_{max}$ will be approximately $f_i$ as well. Therefore, the total number of processes of length between $$\frac{i}{m}$$

and $e_{max}$ is approximately:

$$t_i = \frac{1}{e_{max} - \frac{i}{m}} f_i,$$

which is approximately $mf_i$. Of course, those processes of the same length that started early in the collection cycle will be unseen. Their number can be estimated as:

$$t_{i,unseen} = t_i(1 - e_{max}) = \frac{1 - e_{max}}{e_{max} - \frac{i}{m}} f_i,$$

which is approximately $m(1-e_{max})f_i$. In the next bucket, $B_{i-1}$, all processes have length at least $$\frac{i-1}{m}.$$

The initial quantity of processes in this bucket are counted. Then subtract from the initial quantity $$t_i \frac{1}{m},$$

or the estimated quantity of these processes that have length greater than $$\frac{i}{m}.$$

The remaining processes of whose quantity we will designate $f_{i-1}$ have length between $$\frac{i-1}{m} \text{ and } \frac{i}{m}.$$

The total number of processes of length between $$\frac{i-1}{m}$$

and $$\frac{i}{m}$$

is $t_{i-1} = f_{i-1}m$, and of that quantity, $f_{i-1}$ (m–i) are unseen. In this way, the number of processes in the remaining buckets can be calculated by calculating one bucket at a time and then proceeding to next bucket (i.e., the bucket with the next shortest processes).

In general, to compute the quantity of processes of length between $$\frac{j-1}{m}$$

and $$\frac{j}{m},$$

look at the quantity in the bucket labeled (j–1). Subtract from this quantity the estimates of the longer processes (previously calculated) that landed in this bucket. This new quantity is $f_{j-1}$. Multiply $f_{j-1}$ by m, since all m buckets in the sample interval $\Delta$ are equally likely to have the processes of this length. Of this number, the fraction that is unseen is $$1 - \frac{j}{m}.$$

Therefore, the total number of unseen processes of length between $$\frac{j-1}{m}$$

and $$\frac{j}{m}$$

$$\left(1 - \frac{j}{m}\right) m f_{j-1} = (m - j) f_{j-1}.$$

Figure 21:
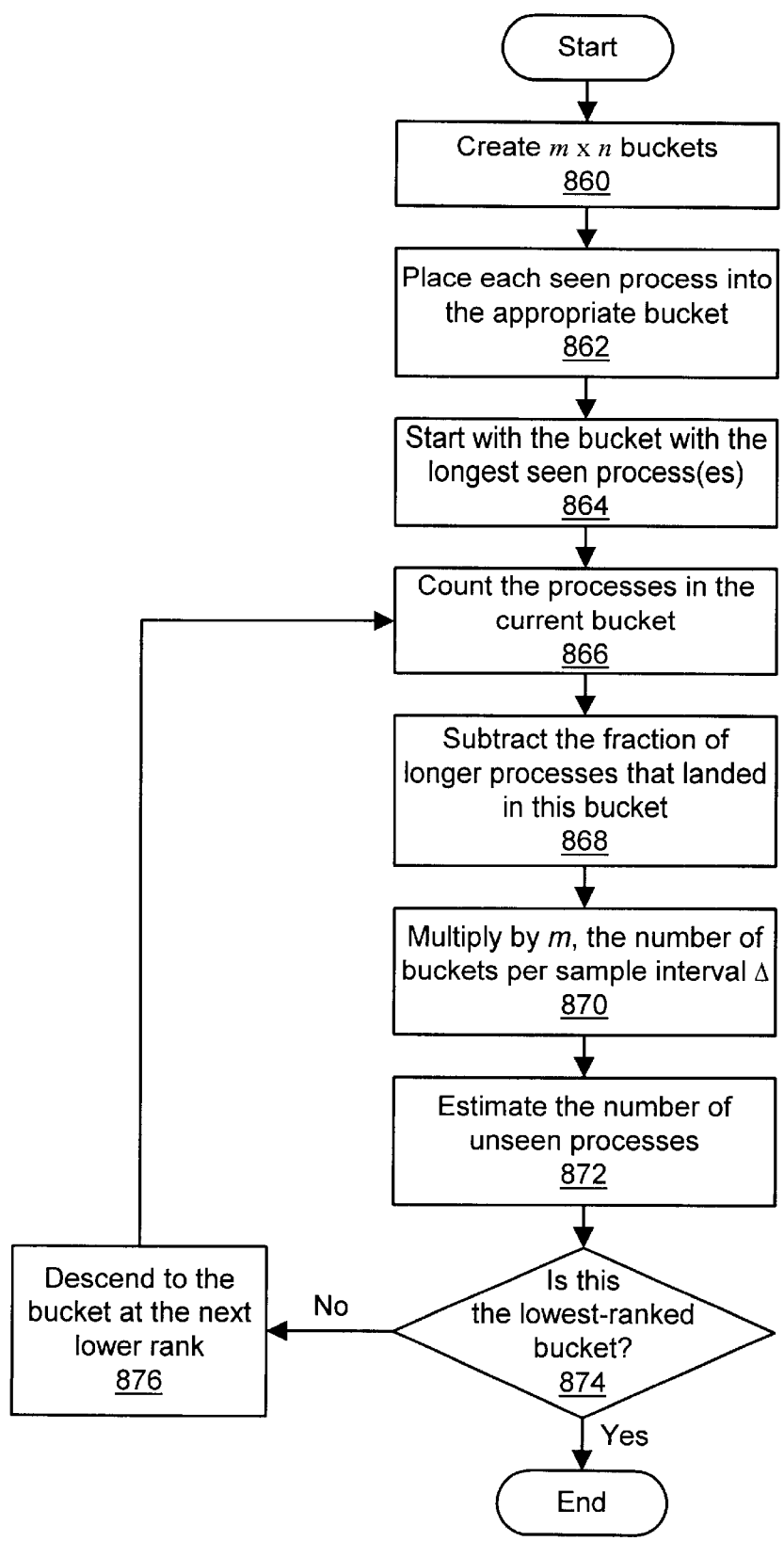
FIG. 21 is a flowchart illustrating the iterative bucket method of estimating the total unseen utilization.

In this way, the number of processes of a given length less than the sample interval can be calculated. As shown in FIG. 21 and as described in detail above, in step 860 create m×n buckets. In step 862 place each of the seen processes into the appropriate bucket, as described above. In step 864 start at the highest-ranked bucket: that is, the bucket with the longest processes. In step 866 count the number of processes in the current bucket (in the first case, the highest-ranked bucket). In step 868, as described in detail above, subtract from the count the fraction of the processes that were previously counted for higher-ranked buckets (when looking at the highest-ranked bucket, subtract zero processes). In step 870, multiply the difference by m, the number of buckets per sample interval $\Delta$. In step 872, estimate the fraction of the product of step 870 which are unseen processes. In step 874, decide whether this is the lowest-ranked bucket. If it is the lowest-ranked bucket, then we stop. If it is not the lowest-ranked bucket, then in step 876 look at the bucket of the next lower rank and go through the process again, starting at step 866. With this iterative technique, the number of unseen processes can be estimated for any number of segments of the sample interval Δ.

If we do not assume that the longest process is shorter than the sample interval Δ, then buckets representing processes seen only once may actually contain processes of length greater than Δ. However, by looking at buckets representing processes that were seen more than once, we can iteratively estimate the number of processes in each bucket that represent processes of minimal possible length by subtracting an estimate of the number of processes in the bucket that had longer length. In other words, the technique described above also encompasses n>1, where n is the maximum number of times that any process is sampled.

The iterative technique described above is useful even when the total measured utilization $U_m$ is known. With this technique, the length distribution of unseen processes can be determined. The distribution should be proportional to the number of unseen processes in each bucket. Let $U_{us(i)}$ be the utilization of unseen processes of length between $$\frac{i}{m}$$

and $e_{max}$, and let $U_{us(j)}$ be the utilization of unseen processes of length between $$\frac{j}{m}$$

and $$\frac{j+1}{m},$$

wherein j=0,1,2, . . . , i−1. The utilization for the unseen processes $U_{us}$ can be distributed as:

$$U_{us(i)} = \frac{t_i(1 - e_{max})}{t_i(1 - e_{max}) + \sum_{k=0}^{i-1}(m - (k+1))f_k} U_{us}, \text{ and}$$

$$U_{us(j)} = \frac{(m - (j+1))f_j}{t_i(1 - e_{max}) + \sum_{k=0}^{i-1}(m - (k+1))f_k} U_{us},$$

wherein j=0,1,2, . . . , i−1. The two equations are illustrated in FIGS. 22 and 23, respectively. In other words, the length distribution of unseen processes is determined by multiplying the total unseen utilization $U_{us}$ by a coefficient, wherein the coefficient and is derived from the iterative method.

In one embodiment, the enterprise is modeled and/or its configuration is altered in response to the determination(s) of utilization described herein. Modeling according to one embodiment is discussed in detail with reference to FIGS. 6 and 7. In various embodiments, this modeling may further comprise one of more of the following: displaying the determination(s) to a user, predicting future performance, graphing a performance prediction, generating reports, asking a user for further data, and permitting a user to modify a model of the enterprise. In one embodiment, Analyze 406 and/or Predict 408, as discussed in detail with reference to FIGS. 6 and 7, implement the modeling, analysis, and/or prediction in response to the determination(s) of utilization. In one embodiment, a configuration of the enterprise is altered in response to the determination(s) of utilization. Altering a configuration of the enterprise may comprise, for example, reconfiguring a network topology or installing additional resources, such as CPUs, software, memory resources, or network routers or hubs.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method for monitoring the state of a computer system, the method comprising:

collecting a set of raw data points over a measurement interval L, wherein the set of raw data points relates to one or more processes on the computer system;

storing the set of raw data points in a memory;

sampling the memory repetitively at a sample interval Δ to create a set of sampled data points, wherein processes which are included in the set of sampled data points are seen processes and processes which are not included in the set of sampled data points are unseen processes, and wherein the set of sampled data points includes a first sampling time and a last sampling time for each seen process;

statistically estimating a total uncaptured utilization $U_{uc}$, wherein the total uncaptured utilization is an estimation of a total length of unsampled segments for the seen processes of the one or more processes over the measurement interval;

statistically estimating a total unseen utilization $U_{us}$, wherein the total unseen utilization is an estimation of a total length of the unseen processes of the one or more processes over the measurement interval.

2. The method of claim 1, wherein the statistically estimating a total uncaptured utilization $U_{uc}$ further comprises:

determining a process service time distribution, wherein the process service time distribution estimates a duration of one or more processes;

determining a quantity $n_{cp}$ of seen processes which follow the process service time distribution;

determining a mean residual time $\bar{r}$ for the process service time distribution, wherein the mean residual time estimates a length of an uncaptured residual segment for each seen process;

determining the total uncaptured utilization $U_{uc}$ according to the following equation:

$$U_{uc} = \frac{\bar{r} n_{cp}}{L},$$

wherein L is the measurement interval.

3. The method of claim 2, wherein the determining a mean residual time $\bar{r}$ further comprises:

determining a conditional probability function $G_t(r)$ for the process service time distribution, wherein $G_t(r)$ is a conditional probability that a residual time $R \leq r$, given that a process time X>t, wherein t is the last sampling time and r is a difference between the last sampling time and a process ending time, and wherein $G_t(r)$ is determined according to the following equation:

$$G_t(r) = P(R \le r) \mid X > t) = \frac{P(t < x \le t+r)}{P(X > t)};$$

determining the mean residual time $\bar{r}$ according to the following equation:

$$\bar{r} = \int_0^\Delta r \, dG_t(r),$$

wherein $\Delta$ is the sample interval.

4. The method of claim 2, wherein the determining a process service time distribution comprises determining that the process service time distribution is an exponential distribution with a service rate $\lambda$;

wherein the determining a quantity $n_{cp}$ of seen processes comprises determining a quantity $n_{cp}$ of seen processes which follow the exponential distribution with the service rate $\lambda$;

wherein the determining a mean residual time $\bar{r}$ further comprises determining the mean residual time $\bar{r}$ according to the following equation:

$$\bar{r} = \frac{1}{\lambda} - \left(\Delta + \frac{1}{\lambda}\right) e^{-\lambda \Delta},$$

wherein $\Delta$ is the sample interval.

5. The method of claim 2, wherein the determining a process service time distribution comprises determining that the process service time distribution is a uniform distribution between zero and a constant C;

wherein the determining a quantity $n_{cp}$ of seen processes comprises determining a quantity $n_{cp}$ of seen processes which follow the uniform distribution between zero and C;

wherein each process has a beginning time, and wherein the set of sampled data points includes the beginning time for each seen process;

wherein the determining a mean residual time $\bar{r}$ further comprises determining the mean residual time $\bar{r}$ according to the following equation:

$$\bar{r} = \frac{\min(C - t, \Delta)}{2},$$

wherein t is the average difference between the last sampling time and the beginning time for the seen processes which follow the uniform distribution between zero and C, wherein $0 \le t \le C$, and wherein $\Delta$ is the sample interval.

6. The method of claim 2, wherein the determining a process service time distribution comprises determining that the process service time distribution is an unknown distribution;

wherein the determining a quantity $n_{cp}$ of seen processes comprises determining a quantity $n_{cp}$ of seen processes which follow the unknown distribution;

wherein each process has a beginning time, and wherein the set of sampled data points includes the beginning time $b_i$ for each seen process;

wherein the determining a mean residual time $\bar{r}$ further comprises determining the mean residual time $\bar{r}$ according to the following equation:

$$\bar{r} = \frac{\sum_{\substack{i=1, \\ \forall s_{il} > 0}}^{n} \max[0, (s_{il} - b_i)]}{\sum_{\substack{i=1, \\ \forall s_{il} > 0}}^{n} 1},$$

wherein n is a total quantity of processes, $s_{il}$ is the first sampling time for each process i, and $b_i$ is a beginning time for each process i.

7. The method of claim 2, wherein the determining a process service time distribution comprises determining that the process service time distribution is an unknown distribution;

wherein the determining a quantity $n_{cp}$ of seen processes comprises determining a quantity $n_{cp}$ of seen processes which follow the unknown distribution;

wherein each process has a beginning time, and wherein the set of sampled data points includes the beginning time $b_i$ for each seen process;

wherein the determining a mean residual time $\bar{r}$ further comprises determining the mean residual time $\bar{r}$ according to the following equation:

$$\bar{r} = \frac{\sum_{i \in CP} (s_{il} - b_i)}{n_{cp}},$$

wherein CP is a set of all seen processes which follow the unknown distribution and $s_{il}$ is the first sampling time for each seen process $i \in CP$.

8. The method of claim 1, wherein the statistically estimating a total uncaptured utilization $U_{uc}$ further comprises:

determining a plurality d of process service time distributions, wherein each process service time distribution j estimates a duration of one or more processes, wherein $1 \le j \le d$;

for each process service time distribution j, determining a quantity $n_{cpj}$ of seen processes which follow that process service time distribution j;

for each process service time distribution j, determining a mean residual time $\bar{r}_j$ for that process service time distribution j, wherein the mean residual time estimates a length of an uncaptured residual segment for each seen process which follows that process service time distribution j;

determining the total uncaptured utilization $U_{uc}$ according to the following equation:

$$U_{uc} = \frac{\sum_{j=1}^{d} \bar{r}_j n_{cpj}}{L},$$

wherein L is the measurement interval.

9. The method of claim 8, wherein the determining a mean residual time $\bar{r}_j$ for each process service time distribution further comprises:

determining a conditional probability function $G_t(r)$ for each process service time distribution, wherein $G_t(r)$ is a conditional probability that a residual time $R \leq r$, given that a process time $X > t$, wherein t is the last sampling time and r is a difference between the last sampling time and a process ending time, and wherein $G_t(r)$ is determined according to the following equation:

$$G_t(r) = P(R \leq r) \mid X > t) = \frac{P(t < x \leq t + r)}{P(X > t)};$$

determining the mean residual time $\bar{r}_j$ according to the following equation:

$$\bar{r}_j = \int_0^\Delta r \, dG_t(r),$$

wherein $\Delta$ is the sample interval.

10. The method of claim 8, wherein the determining a plurality of process service time distributions further comprises determining that one of the process service time distributions is an exponential distribution with a service rate $\lambda$;

wherein the determining a quantity $n_{cpj}$ of seen processes for each process service time distribution further comprises determining a quantity $n_{cpj}$ of seen processes which follow the exponential distribution with the service rate $\lambda$;

wherein the determining a mean residual time $\bar{r}_j$ for each process service time distribution further comprises determining the mean residual time $\bar{r}_j$ for the exponential distribution with the service rate $\lambda$ according to the following equation:

$$\bar{r}_j = \frac{1}{\lambda} - \left(\Delta + \frac{1}{\lambda}\right) e^{-\lambda \Delta},$$

wherein $\Delta$ is the sample interval.

11. The method of claim 8, wherein the determining a plurality of process service time distributions further comprises determining that one of the process service time distributions is a uniform distribution between zero and a constant C;

wherein the determining a quantity $n_{cpj}$ of seen processes for each process service time distribution further comprises determining a quantity $n_{cpj}$ of seen processes which follow the uniform distribution between zero and C;

wherein each process has a beginning time, and wherein the set of sampled data points includes the beginning time for each seen process;

wherein the determining a mean residual time $\bar{r}_j$ for each process service time distribution further comprises determining the mean residual time $\bar{r}_j$ for the uniform distribution between zero and C according to the following equation:

$$\bar{r}_j = \frac{\min(C - t, \Delta)}{2},$$

wherein t is the average difference between the last sampling time and the beginning time for the seen processes which follow the uniform distribution between zero and C, wherein $0 \leq t \leq C$, and wherein $\Delta$ is the sample interval.

12. The method of claim 8, wherein the determining a plurality of process service time distributions further comprises determining that one of the process service time distributions is an unknown distribution;

wherein the determining a quantity $n_{pcj}$ of seen processes for each process service time distribution further comprises determining a quantity $n_{cpj}$ of seen processes which follow the unknown distribution;

wherein each process has a beginning time, and wherein the set of sampled data points includes the beginning time $b_i$ for each seen process;

wherein the determining a mean residual time $\bar{r}_j$ for each process service time distribution further comprises determining the mean residual time $\bar{r}_j$ for the unknown distribution according to the following equation:

$$\bar{r}_j = \frac{\sum_{\substack{i=1, \\ \forall s_{i1} > 0}}^{n} \max[0, (s_{i1} - b_i)]}{\sum_{\substack{i=1, \\ \forall s_{i1} > 0}}^{n} 1},$$

wherein n is a total quantity of processes, $s_{i1}$ is the first sampling time for each process i, and $b_i$ is a beginning time for each process i, and wherein $s_{i1}=0$ for each unseen process and $s_{i1}>0$ for each seen process.

13. The method of claim 8, wherein the determining a plurality of process service time distributions further comprises determining that one of the process service time distributions is an unknown distribution;

wherein the determining a quantity $n_{pcj}$ of seen processes for each process service time distribution further comprises determining a quantity $n_{cpj}$ of seen processes which follow the unknown distribution;

wherein each process has a beginning time, and wherein the set of sampled data points includes the beginning time $b_i$ for each seen process;

wherein the determining a mean residual time $\bar{r}_j$ for each process service time distribution further comprises determining the mean residual time $\bar{r}_j$ for the unknown distribution according to the following equation:

$$\bar{r}_j = \frac{\sum_{i \in CP} (s_{i1} - b_i)}{n_{cpj}},$$

wherein CP is a set of all seen processes which follow the unknown distribution and $s_{i1}$ is the first sampling time for each seen process $i \in CP$.

14. The method of claim 1, further comprising:

determining a total captured utilization $U_c$, wherein the total captured utilization measures a total length of sampled segments for the one or more seen processes over the measurement interval;

determining a total measured utilization $U_m$, wherein the total measured utilization $U_m$ measures a total length of all of the one or more processes over the measurement interval;

wherein the statistically estimating a total unseen utilization $U_{us}$ further comprises determining the total unseen utilization $U_{us}$ according to the following equation:

$$U_{us} = U_m - U_c - U_{uc},$$

wherein $U_{uc}$ is the total uncaptured utilization.

15. The method of claim 14,
wherein each process has a beginning time, and wherein the set of sampled data points includes the beginning time $b_i$ for each seen process;
wherein the determining a total captured utilization $U_c$ further comprises determining $U_c$ according to the following equation:

$$U_c = \frac{\sum_{i \in CP}(s_{im_i} - b_i)}{L},$$

wherein CP is a set of all seen processes, $s_{im_i}$ is the last sampling time for each seen process $i \in CP$, $b_i$ is the beginning time for each seen process $i \in CP$, and L is the measurement interval.

16. The method of claim 1,
wherein the statistically estimating a total unseen utilization $U_{us}$ further comprises:
creating a plurality of buckets;
placing each seen process into one of the plurality of buckets;
estimating a total quantity of unseen processes for each of a plurality of equal length segments of the sample interval $\Delta$, wherein each segment corresponds to a bucket.

17. The method of claim 1,
wherein the statistically estimating a total unseen utilization $U_{us}$ further comprises:
creating a plurality of buckets with m rows and n columns, wherein n is a maximum number of samples in the set of sampled data points for any particular process, wherein m is a multiple of n, and wherein the buckets are ordered from zero to m−1;
placing each seen process into one of the plurality of buckets, wherein the bucket is labeled according to the following equation:

$$(t-1)\frac{m}{n} + i,$$

wherein t is a total quantity of samples in the set of sampled data points for this process, wherein i indicates one of $$\frac{m}{n}$$

equal divisions of the sample interval $\Delta$ such that $$i = 0, 1, \ldots, \frac{m}{n} - 1;$$

estimating a total quantity of unseen processes for each of $$\frac{m}{n}$$

length segments of the sample interval $\Delta$, comprising:
counting a total quantity $f_i$ of processes of the greatest length segment contained in the highest-numbered bucket which contains at least one process;
multiplying $f_i$ by m;
determining a fraction of $m \times f_i$ which are unseen processes;
iteratively estimating a total quantity of unseen processes for each lesser length segment of the sample interval $\Delta$, comprising:
counting an initial quantity of processes of the next lesser length segment contained in the next lower-numbered bucket;
calculating a difference of the initial quantity and a fraction of previously calculated longer processes;
calculating a product of the difference and m;
determining a fraction of the product which are unseen processes.

18. The method of claim 1, further comprising:
determining a length distribution of the unseen processes of a greatest length, comprising multiplying the total unseen utilization $U_{us}$ by a first coefficient;
determining a length distribution of the unseen processes of a lesser length, comprising multiplying the total unseen utilization $U_{us}$ by a second coefficient;
wherein the first coefficient and second coefficient are derived from an iterative method, wherein the iterative method comprises:
creating a plurality of buckets;
placing each seen process into one of the plurality of buckets;
estimating a total quantity of unseen processes for each of a plurality of equal length segments of the sample interval $\Delta$, wherein each length segment corresponds to a bucket.

19. The method of claim 1,
wherein the memory is a registry of metrics.

20. The method of claim 1,
wherein the collecting a set of raw data points, the storing the set of raw data points in a memory, and sampling the memory are performed continually and repetitively over the measurement interval.

21. The method of claim 1,
wherein the collecting a set of raw data points is performed a plurality of times at a collecting frequency;
wherein the sampling the memory is performed a plurality of times at a sampling frequency;
wherein the sampling frequency is less than the collecting frequency.

22. The method of claim 1,
wherein the collecting a set of raw data points, the storing the set of raw data points in a memory, the sampling the memory, the statistically estimating a total uncaptured utilization $U_{uc}$, and the statistically estimating a total unseen utilization $U_{us}$ are performed on a single computer system.

23. The method of claim 1,
wherein the collecting a set of raw data points is performed on a different computer system than the statistically estimating a total uncaptured utilization $U_{uc}$ and the statistically estimating a total unseen utilization $U_{us}$.

24. The method of claim 1, further comprising:
modifying a model of the computer system based on the statistically estimating a total uncaptured utilization $U_{uc}$ and the statistically estimating a total unseen utilization $U_{us}$.

25. The method of claim 1, further comprising:
altering a configuration of the computer system based on the statistically estimating a total uncaptured utilization $U_{uc}$ and the statistically estimating a total unseen utilization $U_{us}$.

26. A method for monitoring the state of a computer system, the method comprising:
collecting a set of raw data points over a measurement interval L, wherein the set of raw data points relates to one or more processes on the computer system;
storing the set of raw data points in a memory;
sampling the memory repetitively at a sample interval $\Delta$ to create a set of sampled data points, wherein processes which are included in the set of sampled data points are seen processes and processes which are not included in the set of sampled data points are unseen processes, and wherein the set of sampled data points includes a first sampling time and a last sampling time for each seen process;
statistically estimating a total uncaptured utilization $U_{uc}$, wherein the total uncaptured utilization is an estimation of a total length of unsampled segments for the seen processes of the one or more processes over the measurement interval, comprising:
determining a plurality d of process service time distributions, wherein each process service time distribution j estimates a duration of one or more processes, wherein $1 \leq j \leq d$;
for each process service time distribution j, determining a quantity $n_{cpj}$ of seen processes which follow that process service time distribution j;
for each process service time distribution j, determining a mean residual time $\bar{r}_j$ for that process service time distribution j, wherein the mean residual time estimates a length of an uncaptured residual segment for each seen process which follows that process service time distribution j;
determining the total uncaptured utilization $U_{uc}$ according to the following equation:

$$U_{uc} = \frac{\sum_{j=1}^{d} \bar{r}_j n_{cpj}}{L};$$

statistically estimating a total unseen utilization $U_{us}$, wherein the total unseen utilization is an estimation of a total length of the unseen processes of the one or more processes over the measurement interval;
modifying a model of the computer system based on the statistically estimating a total uncaptured utilization $U_{uc}$ and the statistically estimating a total unseen utilization $U_{us}$.

27. A method for monitoring the state of a computer system, the method comprising:
collecting a set of raw data points over a measurement interval L, wherein the set of raw data points relates to one or more processes on the computer system;
storing the set of raw data points in a memory;
sampling the memory repetitively at a sample interval $\Delta$ to create a set of sampled data points, wherein processes which are included in the set of sampled data points are seen processes and processes which are not included in the set of sampled data points are unseen processes, and wherein the set of sampled data points includes a first sampling time and a last sampling time for each seen process;
statistically estimating a total uncaptured utilization $U_{uc}$, wherein the total uncaptured utilization is an estimation of a total length of unsampled segments for the seen processes over the measurement interval;
statistically estimating a total unseen utilization $U_{us}$, wherein the total unseen utilization is an estimation of a total length of the unseen processes over the measurement interval, comprising:
creating a plurality of buckets;
placing each seen process into one of the plurality of buckets;
estimating a total quantity of unseen processes for each of a plurality of equal length segments of the sample interval $\Delta$, wherein each segment corresponds to a bucket;
modifying a model of the computer system based on the statistically estimating a total uncaptured utilization $U_{uc}$ and the statistically estimating a total unseen utilization $U_{us}$.

28. A system for monitoring the state of a computer system, the system comprising:
a CPU;
a system memory coupled to the CPU, wherein the system memory stores one or more computer programs executable by the CPU;
wherein the computer programs are executable to:
collect a set of raw data points over a measurement interval L, wherein the set of raw data points relates to a set of processes on the computer system;
store the set of raw data points in a memory;
sample the memory repetitively at a sample interval $\Delta$ to create a set of sampled data points, wherein processes which are included in the set of sampled data points are seen processes and processes which are not included in the set of sampled data points are unseen processes, and wherein the set of sampled data points includes a first sampling time and a last sampling time for each seen process;
statistically estimate a total uncaptured utilization $U_{uc}$, wherein the total uncaptured utilization is an estimation of a total length of unsampled segments for the seen processes over the measurement interval;
statistically estimate a total unseen utilization $U_{us}$, wherein the total unseen utilization is an estimation of a total length of the unseen processes over the measurement interval.

29. The system of claim 28,
wherein in statistically estimating the total uncaptured utilization $U_{uc}$, the computer programs are executable to:
determine a process service time distribution, wherein the process service time distribution estimates a duration of one or more processes;
determine a quantity $n_{cp}$ of seen processes which follow the process service time distribution;
determine a mean residual time $\bar{r}$ for the process service time distribution, wherein the mean residual time estimates a length of an uncaptured residual segment for each seen process;
determine the total uncaptured utilization $U_{uc}$ according to the following equation:

$$U_{uc} = \frac{\bar{r} n_{cp}}{L},$$

wherein L is the measurement interval.

30. The system of claim 29,
wherein in determining a mean residual time $\bar{r}$, the computer programs are further executable to:
  determining a conditional probability function $G_t(r)$ for the process service time distribution, wherein $G_t(r)$ is a conditional probability that a residual time $R \leq r$, given that a process time $X > t$, wherein t is the last sampling time and r is a difference between the last sampling time and a process ending time, and wherein $G_t(r)$ is determined according to the following equation:

$$G_t(r) = P(R \leq r) \mid X > t) = \frac{P(t < x \leq t + r)}{P(X > t)};$$

determining the mean residual time $\bar{r}$ according to the following equation:

$$\bar{r} = \int_0^\Delta r \, dG_t(r),$$

wherein $\Delta$ is the sample interval.

31. The system of claim 29,
wherein in determining a process service time distribution, the computer programs are executable to determine that the process service time distribution is an exponential distribution with a service rate $\lambda$;
wherein in determining a quantity $n_{cp}$ of seen processes, the computer programs are executable to determine a quantity $n_{cp}$ of seen processes which follow the exponential distribution with the service rate $\lambda$;
wherein in determining a mean residual time $\bar{r}$, the computer programs are executable to determine the mean residual time $\bar{r}$ according to the following equation:

$$\bar{r} = \frac{1}{\lambda} - \left(\Delta + \frac{1}{\lambda}\right) e^{-\lambda \Delta},$$

wherein $\Delta$ is the sample interval.

32. The system of claim 29,
wherein in determining a process service time distribution, the computer programs are executable to determine that the process service time distribution is a uniform distribution between zero and a constant C;
wherein in determining a quantity $n_{cp}$ of seen processes, the computer programs are executable to determine a quantity $n_{cp}$ of seen processes which follow the uniform distribution between zero and C;
wherein each process has a beginning time, and wherein the set of sampled data points includes the beginning time for each seen process;
wherein in determining a mean residual time $\bar{r}$, the computer programs are executable to determine the mean residual time $\bar{r}$ according to the following equation:

$$\bar{r} = \frac{\min(C - t, \Delta)}{2},$$

wherein t is the average difference between the last sampling time and the beginning time for the seen processes which follow the uniform distribution between zero and C, wherein $0 \leq t \leq C$, and wherein $\Delta$ is the sample interval.

33. The system of claim 29,
wherein in determining a process service time distribution, the computer programs are executable to determine that the process service time distribution is an unknown distribution;
wherein in determining a quantity $n_{cp}$ of seen processes, the computer programs are executable to determine a quantity $n_{cp}$ of seen processes which follow the unknown distribution;
wherein each process has a beginning time, and wherein the set of sampled data points includes the beginning time $b_i$ for each seen process;
wherein in determining a mean residual time $\bar{r}$, the computer programs are executable to determine the mean residual time $\bar{r}$ according to the following equation:

$$\bar{r} = \frac{\sum_{\substack{i=1, \\ \forall s_{i1} > 0}}^{n} \max[0, (s_{i1} - b_i)]}{\sum_{\substack{i=1, \\ \forall s_{i1} > 0}}^{n} 1},$$

wherein n is a total quantity of processes, $s_{i1}$ is the first sampling time for each process i, and $b_i$ is a beginning time for each process i.

34. The system of claim 29,
wherein in determining a process service time distribution, the computer programs are executable to determine that the process service time distribution is an unknown distribution;
wherein in determining a quantity $n_{cp}$ of seen processes, the computer programs are executable to determine a quantity $n_{cp}$ of seen processes which follow the unknown distribution;
wherein each process has a beginning time, and wherein the set of sampled data points includes the beginning time $b_i$ for each seen process;
wherein in determining a mean residual time $\bar{r}$, the computer programs are executable to determine the mean residual time $\bar{r}$ according to the following equation:

$$\bar{r} = \frac{\sum_{i \in CP} (s_{i1} - b_i)}{n_{cp}},$$

wherein CP is a set of all seen processes which follow the unknown distribution and $s_{i1}$ is the first sampling time for each seen process $i \in CP$.

35. The system of claim 28,
wherein in statistically estimating a total uncaptured utilization $U_{uc}$, the computer programs are executable to:
  determine a set d of process service time distributions, wherein each process service time distribution j estimates a duration of one or more processes, wherein $1 \leq j \leq d$;

for each process service time distribution j, determine a quantity $n_{cpj}$ of seen processes which follow that process service time distribution j;

for each process service time distribution j, determine a mean residual time $\bar{r}_j$ for that process service time distribution j, wherein the mean residual time estimates a length of an uncaptured residual segment for each seen process which follows that process service time distribution j;

determine the total uncaptured utilization $U_{uc}$ according to the following equation:

$$U_{uc} = \frac{\sum_{j=1}^{d} \bar{r}_j n_{cpj}}{L},$$

wherein L is the measurement interval.

36. The system of claim 35, wherein in determining a mean residual time $\bar{r}_j$ for each process service time distribution, the computer programs are executable to:

determine a conditional probability function $G_t(r)$ for each process service time distribution, wherein $G_t(r)$ is a conditional probability that a residual time $R \leq r$, given that a process time $X > t$, wherein t is the last sampling time and r is a difference between the last sampling time and a process ending time, and wherein $G_t(r)$ is determined according to the following equation:

$$G_t(r) = P(R \leq r) \mid X > t) = \frac{P(t < x \leq t + r)}{P(X > t)};$$

determine the mean residual time $\bar{r}_j$ according to the following equation:

$$\bar{r}_j = \int_0^{\Delta} r \, dG_t(r),$$

wherein $\Delta$ is the sample interval.

37. The system of claim 35, wherein in determining a set of process service time distributions, the computer programs are executable to determine that one of the process service time distributions is an exponential distribution with a service rate $\lambda$;

wherein in determining a quantity $n_{cpj}$ of seen processes for each process service time distribution, the computer programs are executable to determine a quantity $n_{cpj}$ of seen processes which follow the exponential distribution with the service rate $\lambda$;

wherein in determining a mean residual time $\bar{r}_j$ for each process service time distribution, the computer programs are executable to determine the mean residual time $\bar{r}_j$ for the exponential distribution with the service rate $\lambda$ according to the following equation:

$$\bar{r}_j = \frac{1}{\lambda} - \left(\Delta + \frac{1}{\lambda}\right) e^{-\lambda \Delta},$$

wherein $\Delta$ is the sample interval.

38. The system of claim 35, wherein in determining a set of process service time distributions, the computer programs are executable to determine that one of the process service time distributions is a uniform distribution between zero and a constant C;

wherein in determining a quantity $n_{cpj}$ of seen processes for each process service time distribution, the computer programs are executable to determine a quantity $n_{cpj}$ of seen processes which follow the uniform distribution between zero and C;

wherein each process has a beginning time, and wherein the set of sampled data points includes the beginning time for each seen process;

wherein in determining a mean residual time $\bar{r}_j$ for each process service time distribution, the computer programs are executable to determine the mean residual time $\bar{r}_j$ for the uniform distribution between zero and C according to the following equation:

$$\bar{r}_j = \frac{\min(C - t, \Delta)}{2},$$

wherein t is the average difference between the last sampling time and the beginning time for the seen processes which follow the uniform distribution between zero and C, wherein $0 \leq t \leq C$, and wherein $\Delta$ is the sample interval.

39. The system of claim 35, wherein in determining a set of process service time distributions, the computer programs are executable to determine that one of the process service time distributions is an unknown distribution;

wherein in determining a quantity $n_{cpj}$ of seen processes for each process service time distribution, the computer programs are executable to determine a quantity $n_{cpj}$ of seen processes which follow the unknown distribution;

wherein each process has a beginning time, and wherein the set of sampled data points includes the beginning time $b_i$ for each seen process;

wherein in determining a mean residual time $\bar{r}_j$ for each process service time distribution, the computer programs are executable to determine the mean residual time $\bar{r}_j$ for the unknown distribution according to the following equation:

$$\bar{r} = \frac{\sum_{\substack{i=1, \\ \forall s_{i1} > 0}}^{n} \max[0, (s_{i1} - b_i)]}{\sum_{\substack{i=1, \\ \forall s_{i1} > 0}}^{n} 1},$$

wherein n is a total quantity of processes, $s_{i1}$ is the first sampling time for each process i, and $b_i$ is a beginning time for each process i, and wherein $s_{i1} = 0$ for each unseen process and $s_{i1} > 0$ for each seen process.

40. The system of claim 35, wherein in determining a set of process service time distributions, the computer programs are executable to determine that one of the process service time distributions is an unknown distribution;

wherein in determining a quantity $n_{cpj}$ of seen processes for each process service time distribution, the computer programs are executable to determine a quantity $n_{cpj}$ of seen processes which follow the unknown distribution;

wherein each process has a beginning time, and wherein the set of sampled data points includes the beginning time $b_i$ for each seen process;

wherein in determining a mean residual time $\bar{r}_j$ for each process service time distribution, the computer programs are executable to determine the mean residual time $\bar{r}_j$ for the unknown distribution according to the following equation:

$$\bar{r}_j = \frac{\sum_{i \in CP}(s_{iI} - b_i)}{n_{cpj}},$$

wherein CP is a set of all seen processes which follow the unknown distribution and $s_{iI}$ is the first sampling time for each seen process $i \in CP$.

41. The system of claim 28,
wherein the computer programs are further executable to:
  determine a total captured utilization $U_c$, wherein the total captured utilization measures a total length of sampled segments for one or more seen processes of over the measurement interval;
  determine a total measured utilization $U_m$, wherein the total measured utilization $U_m$ measures a total length of all of the one or more processes over the measurement interval;
  wherein in statistically estimating a total unseen utilization $U_{us}$, the computer programs are executable to determine the total unseen utilization $U_{us}$ according to the following equation:

$$U_{us} = U_m - U_c - U_{uc},$$

wherein $U_{uc}$ is the total uncaptured utilization.

42. The system of claim 41,
wherein each process has a beginning time, and wherein the set of sampled data points includes the beginning time $b_i$ for each seen process;
wherein in determining a total captured utilization $U_c$, the computer programs are executable to determine $U_c$ according to the following equation:

$$U_c = \frac{\sum_{i \in CP}(s_{im_i} - b_i)}{L},$$

wherein CP is a set of all seen processes, $S_{im_i}$ is the last sampling time for each seen process $i \in CP$, $b_i$ is the beginning time for each seen process $i \in CP$, and L is the measurement interval.

43. The system of claim 28,
wherein in statistically estimating a total unseen utilization $U_{us}$, the computer programs are executable to:
  create a plurality of buckets;
  place each seen process into one of the plurality of buckets;
  estimate a total quantity of unseen processes for each of a plurality of equal length segments of the sample interval $\Delta$, wherein each segment corresponds to a bucket.

44. The system of claim 28,
wherein in statistically estimating a total unseen utilization $U_{us}$, the computer programs are executable to:
  create a plurality of buckets with m rows and n columns, wherein n is a maximum number of samples in the set of sampled data points for any particular process, wherein m is a multiple of n, and wherein the buckets are ordered from zero to m−1;
  place each seen process into one of the plurality of buckets, wherein the bucket is labeled according to the following equation:

$$(t-1)\frac{m}{n} + i,$$

wherein t is a total quantity of samples in the set of sampled data points for this process, wherein i indicates one of $$\frac{m}{n}$$

equal divisions of the sample interval $\Delta$ such that $$i = 0, 1, \ldots, \frac{m}{n} - 1;$$

estimate a total quantity of unseen processes for each of m/n length segments of the sample interval $\Delta$, wherein the computer programs are executable to:
    count a total quantity $f_i$ of processes of the greatest length segment contained in the highest-numbered bucket which contains at least one process;
    multiply $f_i$ by m;
    determine a fraction of m×$f_i$ which are unseen processes;
    iteratively estimate a total quantity of unseen processes for each lesser length segment of the sample interval $\Delta$, wherein the computer programs are executable to:
      count an initial quantity of processes of the next lesser length segment contained in the next lower-numbered bucket;
      calculate a difference of the initial quantity and a fraction of previously calculated longer processes;
      calculate a product of the difference and m;
      determine a fraction of the product which are unseen processes.

45. The system of claim 28,
wherein the computer programs are further executable to:
  determine a length distribution of the unseen processes of a greatest length, comprising multiplying the total unseen utilization $U_{us}$ by a first coefficient;
  determine a length distribution of the unseen processes of a lesser length, comprising multiplying the total unseen utilization $U_{us}$ by a second coefficient;
  wherein the first coefficient and second coefficient are derived from an iterative method, wherein in performing the iterative method to determine the first coefficient and second coefficient, the computer programs are executable to:
    create a plurality of buckets;
    place each seen process into one of the plurality of buckets;
    estimate a total quantity of unseen processes for each of a plurality of equal length segments of the sample interval $\Delta$, wherein each length segment corresponds to a bucket.

46. The system of claim 28,
wherein the memory comprises a registry of metrics.

47. The system of claim 28,
wherein the computer programs are further executable to modify a model of the computer system based on the statistically estimating a total uncaptured utilization $U_{uc}$ and the statistically estimating a total unseen utilization $U_{us}$.

48. The system of claim 28, wherein the computer programs are further executable to alter a configuration of the computer system based on the statistically estimating a total uncaptured utilization $U_{uc}$ and the statistically estimating a total unseen utilization $U_{us}$.

49. A memory medium which stores program instructions for monitoring the state of a computer system, wherein the program instructions are executable to implement:

collecting a set of raw data points over a measurement interval L, wherein the set of raw data points relates to a one or more processes on the computer system;

storing the set of raw data points in a memory;

sampling the memory repetitively at a sample interval $\Delta$ to create a set of sampled data points, wherein processes which are included in the set of sampled data points are seen processes and processes which are not included in the set of sampled data points are unseen processes, and wherein the set of sampled data points includes a first sampling time and a last sampling time for each seen process;

statistically estimating a total uncaptured utilization $U_{uc}$, wherein the total uncaptured utilization is an estimation of a total length of unsampled segments for the seen processes over the measurement interval;

statistically estimating a total unseen utilization $U_{us}$, wherein the total unseen utilization is an estimation of a total length of the unseen processes over the measurement interval.

50. The memory medium of claim 49, wherein the statistically estimating a total uncaptured utilization $U_{uc}$ further comprises:

determining a process service time distribution, wherein the process service time distribution estimates a duration of one or more processes;

determining a quantity $n_{cp}$ of seen processes which follow the process service time distribution;

determining a mean residual time $\bar{r}$ for the process service time distribution, wherein the mean residual time estimates a length of an uncaptured residual segment for each seen process; and determining the total uncaptured utilization $U_{uc}$ according to the following equation:

$$U_{uc} = \frac{\bar{r} n_{cp}}{L},$$

wherein L is the measurement interval.

51. The memory medium of claim 50, wherein the determining a mean residual time $\bar{r}$ further comprises:

determining a conditional probability function $G_t(r)$ for the process service time distribution, wherein $G_t(r)$ is a conditional probability that a residual time $R \leq r$, given that a process time $X > t$, wherein t is the last sampling time and r is a difference between the last sampling time and a process ending time, and wherein $G_t(r)$ is determined according to the following equation:

$$G_t(r) = P(R \leq r) | X > t) = \frac{P(t < x \leq t+r)}{P(X > t)};$$

determining the mean residual time $\bar{r}$ according to the following equation:

$$\bar{r} = \int_0^\Delta r \, dG_t(r),$$

wherein $\Delta$ is the sample interval.

52. The memory medium of claim 50, wherein the determining a process service time distribution comprises determining that the process service time distribution is an exponential distribution with a service rate $\lambda$;

wherein the determining a quantity $n_{cp}$ of seen processes comprises determining a quantity $n_{cp}$ of seen processes which follow the exponential distribution with the service rate $\lambda$;

wherein the determining a mean residual time $\bar{r}$ further comprises determining the mean residual time $\bar{r}$ according to the following equation:

$$\bar{r} = \frac{1}{\lambda} - \left(\Delta + \frac{1}{\lambda}\right) e^{-\lambda \Delta},$$

wherein $\Delta$ is the sample interval.

53. The memory medium of claim 50, wherein the determining a process service time distribution comprises determining that the process service time distribution is a uniform distribution between zero and a constant C;

wherein the determining a quantity $n_{cp}$ of seen processes comprises determining a quantity $n_{cp}$ of seen processes which follow the uniform distribution between zero and C;

wherein each process has a beginning time, and wherein the set of sampled data points includes the beginning time for each seen process;

wherein the determining a mean residual time $\bar{r}$ further comprises determining the mean residual time $\bar{r}$ according to the following equation:

$$\bar{r} = \frac{\min(C - t, \Delta)}{2},$$

wherein t is the average difference between the last sampling time and the beginning time for the seen processes which follow the uniform distribution between zero and C, wherein $0 \leq t \leq C$, and wherein $\Delta$ is the sample interval.

54. The memory medium of claim 50, wherein the determining a process service time distribution comprises determining that the process service time distribution is an unknown distribution;

wherein the determining a quantity $n_{cp}$ of seen processes comprises determining a quantity $n_{cp}$ of seen processes which follow the unknown distribution;

wherein each process has a beginning time, and wherein the set of sampled data points includes the beginning time $b_i$ for each seen process;

wherein the determining a mean residual time $\bar{r}$ further comprises determining the mean residual time $\bar{r}$ according to the following equation:

$$\bar{r} = \frac{\sum_{\substack{i=1,\\ \forall s_{i1}>0}}^{n} \max[0, (s_{i1} - b_i)]}{\sum_{\substack{i=1,\\ \forall s_{i1}>0}}^{n} 1},$$

wherein n is a total quantity of processes, $s_{i1}$ is the first sampling time for each process i, and $b_i$ is a beginning time for each process i.

55. The memory medium of claim 50,
wherein the determining a process service time distribution comprises determining that the process service time distribution is an unknown distribution;
wherein the determining a quantity $n_{cp}$ of seen processes comprises determining a quantity $n_{cp}$ of seen processes which follow the unknown distribution;
wherein each process has a beginning time, and wherein the set of sampled data points includes the beginning time $b_i$ for each seen process;
wherein the determining a mean residual time $\bar{r}$ further comprises determining the mean residual time $\bar{r}$ according to the following equation:

$$\bar{r} = \frac{\sum_{i \in CP} (s_{i1} - b_i)}{n_{cp}},$$

wherein CP is a set of all seen processes which follow the unknown distribution and $s_{i1}$ is the first sampling time for each seen process $i \in CP$.

56. The memory medium of claim 49,
wherein the statistically estimating a total uncaptured utilization $U_{uc}$ further comprises:
  determining a set d of process service time distributions, wherein each process service time distribution j estimates a duration of one or more processes, wherein $1 \leq j \leq d$;
  for each process service time distribution j, determining a quantity $n_{cpj}$ of seen processes which follow that process service time distribution j;
  for each process service time distribution j, determining a mean residual time $\bar{r}_j$ for that process service time distribution j, wherein the mean residual time estimates a length of an uncaptured residual segment for each seen process which follows that process service time distribution j; and
  determining the total uncaptured utilization $U_{uc}$ according to the following equation:

$$U_{uc} = \frac{\sum_{j=1}^{d} \bar{r}_j n_{cpj}}{L},$$

wherein L is the measurement interval.

57. The memory medium of claim 56,
wherein the determining a mean residual time $\bar{r}_j$ for each process service time distribution further comprises:
  determining a conditional probability function $G_t(r)$ for each process service time distribution, wherein $G_t(r)$ is a conditional probability that a residual time $R \leq r$, given that a process time $X > t$, wherein t is the last sampling time and r is a difference between the last sampling time and a process ending time, and wherein $G_t(r)$ is determined according to the following equation:

$$G_t(r) = P(R \leq r) \mid X > t) = \frac{P(t < x \leq t + r)}{P(X > t)};$$

determining the mean residual time $\bar{r}_j$ according to the following equation:

$$\bar{r}_j = \int_0^\Delta r \, dG_t(r),$$

wherein $\Delta$ is the sample interval.

58. The memory medium of claim 56,
wherein the determining a set of process service time distributions further comprises determining that one of the process service time distributions is an exponential distribution with a service rate $\lambda$;
wherein the determining a quantity $n_{cpj}$ of seen processes for each process service time distribution further comprises determining a quantity $n_{cpj}$ of seen processes which follow the exponential distribution with the service rate $\lambda$;
wherein the determining a mean residual time $\bar{r}_j$ for each process service time distribution further comprises determining the mean residual time $\bar{r}_j$ for the exponential distribution with the service rate $\lambda$ according to the following equation:

$$\bar{r}_j = \frac{1}{\lambda} - \left(\Delta + \frac{1}{\lambda}\right) e^{-\lambda \Delta},$$

wherein $\Delta$ is the sample interval.

59. The memory medium of claim 56,
wherein the determining a set of process service time distributions further comprises determining that one of the process service time distributions is a uniform distribution between zero and a constant C;
wherein the determining a quantity $n_{cpj}$ of seen processes for each process service time distribution further comprises determining a quantity $n_{cpj}$ of seen processes which follow the uniform distribution between zero and C;
wherein each process has a beginning time, and wherein the set of sampled data points includes the beginning time for each seen process;
wherein the determining a mean residual time $\bar{r}_j$ for each process service time distribution further comprises determining the mean residual time $\bar{r}_j$ for the uniform distribution between zero and C according to the following equation:

$$\bar{r}_j = \frac{\min(C - t, \Delta)}{2},$$

wherein t is the average difference between the last sampling time and the beginning time for the seen processes which follow the uniform distribution between zero and C, wherein $0 \leq t \leq C$, and wherein $\Delta$ is the sample interval.

60. The memory medium of claim 56, wherein the determining a set of process service time distributions further comprises determining that one of the process service time distributions is an unknown distribution;

wherein the determining a quantity $n_{cpj}$ of seen processes for each process service time distribution further comprises determining a quantity $n_{cpj}$ of seen processes which follow the unknown distribution;

wherein each process has a beginning time, and wherein the set of sampled data points includes the beginning time $b_i$ for each seen process;

wherein the determining a mean residual time $\bar{r}_j$ for each process service time distribution further comprises determining the mean residual time $\bar{r}_j$ for the unknown distribution according to the following equation:

$$\bar{r}_j = \frac{\sum_{\substack{i=1, \\ \forall s_{iI}>0}}^{n} \max[0, (s_{iI} - b_i)]}{\sum_{\substack{i=1, \\ \forall s_{iI}>0}}^{n} 1},$$

wherein n is a total quantity of processes, $s_{iI}$ is the first sampling time for each process i, and $b_i$ is a beginning time for each process i, and wherein $s_{iI}=0$ for each unseen process and $s_{iI}>0$ for each seen process.

61. The memory medium of claim 56, wherein the determining a set of process service time distributions further comprises determining that one of the process service time distributions is an unknown distribution;

wherein the determining a quantity $n_{pcj}$ of seen processes for each process service time distribution further comprises determining a quantity $n_{cpj}$ of seen processes which follow the unknown distribution;

wherein each process has a beginning time, and wherein the set of sampled data points includes the beginning time $b_i$ for each seen process;

wherein the determining a mean residual time $\bar{r}_j$ for each process service time distribution further comprises determining the mean residual time $\bar{r}_j$ for the unknown distribution according to the following equation:

$$\bar{r}_j = \frac{\sum_{i \in CP} (s_{iI} - b_i)}{n_{cpj}},$$

wherein CP is a set of all seen processes which follow the unknown distribution and $s_{iI}$ is the first sampling time for each seen process $i \in CP$.

62. The memory medium of claim 49, wherein the program instructions further implement:
  determining a total captured utilization $U_c$, wherein the total captured utilization measures a total length of sampled segments for the one or more seen processes over the measurement interval; and
  determining a total measured utilization $U_m$, wherein the total measured utilization measures a total length of all of the one or more processes over the measurement interval;

wherein the statistically estimating a total unseen utilization $U_{us}$ further comprises determining the total unseen utilization $U_{us}$ according to the following equation:

$$U_{us} = U_m - U_c U_{uc},$$

wherein $U_{uc}$ is the total uncaptured utilization.

63. The memory medium of claim 62, wherein each process has a beginning time, and wherein the set of sampled data points includes the beginning time $b_i$ for each seen process;

wherein the determining a total captured utilization $U_c$ further comprises determining $U_c$ according to the following equation:

$$U_c = \frac{\sum_{i \in CP} (s_{im_i} - b_i)}{L},$$

wherein CP is a set of all seen processes, $s_{im_i}$ is the last sampling time for each seen process $i \in CP$, $b_i$ is the beginning time for each seen process $i \in CP$, and L is the measurement interval.

64. The memory medium of claim 49, wherein the statistically estimating a total unseen utilization $U_{us}$ further comprises:
  creating a plurality of buckets;
  placing each seen process into one of the plurality of buckets; and
  estimating a total quantity of unseen processes for each of a plurality of equal length segments of the sample interval $\Delta$, wherein each segment corresponds to a bucket.

65. The memory medium of claim 49, wherein the statistically estimating a total unseen utilization $U_{us}$ further comprises:
  creating a plurality of buckets with m rows and n columns, wherein n is a maximum number of samples in the set of sampled data points for any particular process, wherein m is a multiple of n, and wherein the buckets are ordered from zero to m−1;
  placing each seen process into one of the plurality of buckets, wherein the bucket is labeled according to the following equation:

$$(t-1)\frac{m}{n} + i,$$

wherein t is a total quantity of samples in the set of sampled data points for this process, wherein i indicates one of $$\frac{m}{n}$$

equal divisions of the sample interval $\Delta$ such that $$i = 0, 1, \ldots, \frac{m}{n} - 1;$$

and
  estimating a total quantity of unseen processes for each of $$\frac{m}{n}$$

length segments of the sample interval Δ, comprising:
    counting a total quantity $f_i$ of processes of the greatest length segment contained in the highest-numbered bucket which contains at least one process;
    multiplying $f_i$ by m;
    determining a fraction of $m \times f_i$ which are unseen processes; and
    iteratively estimating a total quantity of unseen processes for each lesser length segment of the sample interval Δ, comprising:
        counting an initial quantity of processes of the next lesser length segment contained in the next lower-numbered bucket;
        calculating a difference of the initial quantity and a fraction of previously calculated longer processes;
        calculating a product of the difference and m; and
        determining a fraction of the product which are unseen processes.

66. The memory medium of claim 49, wherein the program instructions further implement:
    determining a length distribution of the unseen processes of a greatest length, comprising multiplying the total unseen utilization $U_{us}$ by a first coefficient; and
    determining a length distribution of the unseen processes of a lesser length, comprising multiplying the total unseen utilization $U_{us}$ by a second coefficient;
    wherein the first coefficient and second coefficient are derived from an iterative method, wherein the iterative method comprises:
        creating a plurality of buckets;
        placing each seen process into one of the plurality of buckets; and
        estimating a total quantity of unseen processes for each of a plurality of equal length segments of the sample interval Δ, wherein each length segment corresponds to a bucket.

67. The memory medium of claim 49, wherein the memory comprises a registry of metrics.

68. The memory medium of claim 49, wherein the collecting a set of raw data points, the storing the set of raw data points in a memory, and sampling the memory are performed continually and repetitively over the measurement interval.

69. The memory medium of claim 49,
wherein the collecting a set of raw data points is performed a plurality of times at a collecting frequency;
wherein the sampling the memory is performed a plurality of times at a sampling frequency;
wherein the sampling frequency is less than the collecting frequency.

70. The memory medium of claim 49, wherein the collecting a set of raw data points, the storing the set of raw data points in a memory, the sampling the memory, the statistically estimating a total uncaptured utilization $U_{uc}$, and the statistically estimating a total unseen utilization $U_{us}$ are performed on a single computer system.

71. The memory medium of claim 49,
wherein the collecting a set of raw data points is performed on a different computer system than the statistically estimating a total uncaptured utilization $U_{uc}$ and the statistically estimating a total unseen utilization $U_{us}$.

72. The memory medium of claim 49,
wherein the programs instructions further implement modifying a model of the computer system based on the statistically estimating a total uncaptured utilization $U_{uc}$ and the statistically estimating a total unseen utilization $U_{us}$.

73. The memory medium of claim 49,
wherein the programs instructions further implement altering a configuration of the computer system based on the statistically estimating a total uncaptured utilization $U_{uc}$ and the statistically estimating a total unseen utilization $U_{us}$.

74. A memory medium which stores program instructions for monitoring the state of a computer system, wherein the program instructions are executable to implement:
    collecting a set of raw data points over a measurement interval L, wherein the set of raw data points relates to one or more processes on the computer system;
    storing the set of raw data points in a memory;
    sampling the memory repetitively at a sample interval Δ to create a set of sampled data points, wherein processes which are included in the set of sampled data points are seen processes and processes which are not included in the set of sampled data points are unseen processes, and wherein the set of sampled data points includes a first sampling time and a last sampling time for each seen process;
    statistically estimating a total uncaptured utilization $U_{uc}$, wherein the total uncaptured utilization is an estimation of a total length of unsampled segments for the seen processes of the one or more processes over the measurement interval, comprising:
        determining a set d of process service time distributions, wherein each process service time distribution j estimates a duration of one or more processes, wherein $1 \leq j \leq d$;
        for each process service time distribution j, determining a quantity $n_{cpj}$ of seen processes which follow that process service time distribution j;
        for each process service time distribution j, determining a mean residual time $\bar{r}_j$ for that process service time distribution j, wherein the mean residual time estimates a length of an uncaptured residual segment for each seen process which follows that process service time distribution j; and
        determining the total uncaptured utilization $U_{uc}$ according to the following equation:

$$U_{uc} = \frac{\sum_{j=1}^{d} \bar{r}_j n_{cpj}}{L};$$

statistically estimating a total unseen utilization $U_{us}$, wherein the total unseen utilization is an estimation of a total length of the unseen processes of the one or more processes over the measurement interval; and modifying a model of the computer system based on the statistically estimating a total uncaptured utilization $U_{uc}$ and the statistically estimating a total unseen utilization $U_{us}$.

75. A memory medium which stores program instructions for monitoring the state of a computer system, wherein the program instructions are executable to implement:

collecting a set of raw data points over a measurement interval L, wherein the set of raw data points relates to one or more processes on the computer system;

storing the set of raw data points in a memory;

sampling the memory repetitively at a sample interval Δ to create a set of sampled data points, wherein processes which are included in the set of sampled data points are seen processes and processes which are not included in the set of sampled data points are unseen processes, and wherein the set of sampled data points includes a first sampling time and a last sampling time for each seen process;

statistically estimating a total uncaptured utilization $U_{uc}$, wherein the total uncaptured utilization is an estimation of a total length of unsampled segments for the seen processes over the measurement interval; and statistically estimating a total unseen utilization $U_{us}$, wherein the total unseen utilization is an estimation of a total length of the unseen processes over the measurement interval, comprising:

creating a plurality of buckets;

placing each seen process into one of the plurality of buckets;

estimating a total quantity of unseen processes for each of a plurality of equal length segments of the sample interval Δ, wherein each segment corresponds to a bucket; and modifying a model of the computer system based on the statistically estimating a total uncaptured utilization $U_{uc}$ and the statistically estimating a total unseen utilization $U_{us}$.

* * * * *